(12) United States Patent
Sato

(10) Patent No.: US 12,319,101 B2
(45) Date of Patent: Jun. 3, 2025

(54) TIRE AIR SUPPLEMENTING DEVICE

(71) Applicant: MURAKAMI CORPORATION, Shizuoka (JP)

(72) Inventor: Hidenori Sato, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 331 days.

(21) Appl. No.: 18/019,900

(22) PCT Filed: Jun. 15, 2021

(86) PCT No.: PCT/JP2021/022708
§ 371 (c)(1),
(2) Date: Feb. 6, 2023

(87) PCT Pub. No.: WO2022/044497
PCT Pub. Date: Mar. 3, 2022

(65) Prior Publication Data
US 2023/0278375 A1 Sep. 7, 2023

(30) Foreign Application Priority Data
Aug. 25, 2020 (JP) ................................. 2020-141988

(51) Int. Cl.
*B60C 23/12* (2006.01)
(52) U.S. Cl.
CPC .......... *B60C 23/129* (2020.05); *B60C 23/133* (2020.05)
(58) Field of Classification Search
CPC ... B60C 23/133; B60C 23/131; B60C 23/129; B60C 23/12

(Continued)

(56) References Cited

U.S. PATENT DOCUMENTS 5,556,489 A * 9/1996 Curlett .................. B60C 23/133
417/233
11,560,024 B1 * 1/2023 Hamilton ................ B60C 29/04
(Continued)

FOREIGN PATENT DOCUMENTS

CN          1535853      10/2004
CN        103386867      11/2013
(Continued)

OTHER PUBLICATIONS

International Search Report issued in International Patent Application No. PCT/JP2021/022708, dated Aug. 24, 2021.
(Continued)

*Primary Examiner* — Kip T Kotter
*Assistant Examiner* — Alex Palmer
(74) *Attorney, Agent, or Firm* — GREENBLUM & BERNSTEIN, P.L.C.

(57) ABSTRACT

A tire air filling device according to one embodiment includes: a cylinder; a weight which has an air flow hole and which receives a centrifugal force to move and cause air to be supplied to an inside of a tire; a first sealing member; a first spring; a first support portion; and a backflow prevention valve. The backflow prevention valve includes a slide member that slides in the air flow hole in an axial direction, a second spring that biases the slide member to a side opposite the tire, a second support portion that supports an end portion of the second spring in the axial direction; and a second sealing member interposed between an inner surface of the air flow hole and the slide member. The slide member, the second spring, and the second support portion are disposed inside the weight.

7 Claims, 15 Drawing Sheets

(58) Field of Classification Search
USPC .......................................................... 152/419
See application file for complete search history.

(56) References Cited

U.S. PATENT DOCUMENTS

2008/0308206 A1    12/2008  Okada
2009/0107602 A1     4/2009  Kabakov
2015/0075642 A1     3/2015  Fazekas

FOREIGN PATENT DOCUMENTS

| CN | 108237852   | 7/2018  |
| JP | 2004-330820 | 11/2004 |
| JP | 2006-44313  | 2/2006  |
| JP | 2008-308081 | 12/2008 |
| JP | 2017-136975 | 8/2017  |

OTHER PUBLICATIONS

International Preliminary Report on Patentability issued in International Patent Application No. 20150075642, dated Feb. 28, 2023.

* cited by examiner

— TIRE AIR SUPPLEMENTING DEVICE

TECHNICAL FIELD

The present disclosure relates to a tire air filling device that fills the inside of a tire with air.

Priority is claimed on Japanese Patent Application No. 2020-141988, filed on Aug. 25, 2020, the entire content of which is incorporated herein by reference.

BACKGROUND ART

In the related art, a tire air filling device that fills the inside of a tire of an automobile or the like with air has been known. Japanese Unexamined Patent Publication No. 2008-308081 discloses an air pressure adjusting device attached to a spoke of a wheel. A part of the air pressure adjusting device protrudes from an outer peripheral surface of a rim of the wheel to an internal space of the tire. The air pressure adjusting device includes a cylinder screwed into the spoke, and a piston that is reciprocatably provided inside the cylinder.

A first umbrella valve that opens and closes an air flow path in the cylinder is attached to an end portion on a tire side of the cylinder. The first umbrella valve functions as a check valve that prevents a backflow of the air from the internal space of the tire into the cylinder. When an air pressure inside the cylinder is larger than an air pressure in the internal space of the tire, the first umbrella valve opens a flow path and allows a flow of the air from the inside of the cylinder to the internal space of the tire. When the air pressure inside the cylinder is smaller than the air pressure in the internal space of the tire, the first umbrella valve prevents a flow of the air.

The piston partitions an internal space of the cylinder into a first chamber and a second chamber, and the second chamber communicates with the internal space of the tire. A recessed portion is formed in an end portion of the piston exposed to the first chamber. The recessed portion is provided with a partition wall. The partition wall defines a third chamber inside the piston, the third chamber being partitioned off from the first chamber. A second umbrella valve that opens and closes a through-hole of the piston that is an air flow path from the first chamber to the third chamber is attached to the partition wall. A coil spring that biases the piston toward the first chamber is disposed between the piston and a bottom surface of the internal space of the cylinder.

In the air pressure adjusting device, when the rotational speed of the wheel increases as the automobile travels, a centrifugal force acts on the piston. With the centrifugal force, the piston moves against a biasing force of the coil spring to reduce the volume of the second chamber. When the second chamber is reduced in volume, the air pressure of the second chamber is increased. In a state where the air pressure in the internal space of the tire is lower than a reference air pressure, the first umbrella valve is opened, and the air of the second chamber is injected to the internal space of the tire.

When the automobile decelerates and the rotational speed of the wheel decreases, the piston is moved by the biasing force of the coil spring to increase the volume of the second chamber. Accordingly, when the pressure of the second chamber decreases and becomes lower than the air pressure in the internal space of the tire, the first umbrella valve is closed. In a process of the movement of the piston, when the pressure of the second chamber is lower than a pressure of the first chamber, the second umbrella valve is opened, and the air is introduced from the first chamber to the second chamber.

CITATION LIST

Patent Literature

Patent Literature 1: Japanese Unexamined Patent Publication No. 2008-308081

SUMMARY OF INVENTION

Technical Problem

The air pressure adjusting device described above includes the first umbrella valve provided between the internal space of the tire and the second chamber of the cylinder, and the second umbrella valve provided between the third chamber of the piston and the first chamber. The umbrella valves function as valves by opening and closing the flow path using respective umbrella-shaped portions. The umbrella valves each have a large diameter, which is a problem. Therefore, a diameter of the piston and a diameter of the cylinder have to be increased in accordance with the diameters of the umbrella valves.

When the diameter of the piston that moves inside the cylinder is large, a large load is required when moving the piston, according to Pascal's principle. Since the piston does not move sufficiently unless a large load is applied to the piston, the air cannot be sufficiently supplied to the tire, which is a problem. For example, since the piston is not sufficiently moved merely by routine traveling of the automobile at a speed of 50 km/h or less, a situation where the air cannot be supplied to the tire may occur.

An object of the present disclosure is to provide a tire air filling device capable of sufficiently supplying air to a tire.

Solution to Problem

A tire air filling device according to one aspect of the present disclosure is a tire air filling device that is provided in a wheel attached to a tire, and that compresses air to fill an inside of the tire with the air. The tire air filling device includes: a cylinder having an opening facing the inside of the tire; a weight that is provided inside the cylinder, that has an air flow hole through which the air to be supplied to the inside of the tire passes, and that receives a centrifugal force to move in an axial direction of the cylinder and to cause the air to be supplied from the opening to the inside of the tire; a first sealing member interposed between the weight and an inner surface of the cylinder; a first spring that biases the weight to a side opposite the tire; a first support portion that supports an end portion of the first spring in the axial direction; and a backflow prevention valve that prevents a backflow of the air from the weight to the side opposite the tire. The backflow prevention valve includes a slide member that slides in the air flow hole in the axial direction, a second spring that biases the slide member to the side opposite the tire, a second support portion that supports an end portion of the second spring in the axial direction, and a second sealing member interposed between an inner surface of the air flow hole and the slide member. The slide member, the second spring, and the second support portion are disposed inside the weight.

In the tire air filling device, the weight that is moved in the axial direction of the cylinder by centrifugal force to cause the air to be supplied to the inside of the tire is provided inside the cylinder. The weight receives a centrifugal force generated by acceleration or deceleration of rotation of the tire, to move and cause the air to be supplied to the inside of the tire. Therefore, the tire can be automatically filled with the air as an automobile travels. The tire is filled with the air through the movement of the weight, so that the tire can be automatically filled with the air even without an electric circuit and the like. The tire air filling device includes the backflow prevention valve. The backflow prevention valve includes the slide member, the second spring, the second support portion, and the second sealing member. The slide member, the second spring, and the second support portion are disposed inside the weight. Therefore, instead of an umbrella-shaped valve such as an umbrella valve, the backflow prevention valve is configured, and each part of the backflow prevention valve is provided inside the weight. Therefore, the weight can be reduced in diameter. Since the weight that is reduced in diameter can be sufficiently moved by a small load according to Pascal's principle, the air can be sufficiently supplied to the tire. As a result, the weight can be sufficiently moved and the air can be sufficiently supplied to the tire merely by routine traveling of the automobile at a speed of 50 km/h or less.

The cylinder may be fixed to a spoke of the wheel. A width of the weight in a direction orthogonal to the axial direction may be smaller than a width of the spoke. In this case, since the width of the weight is thinner than the width of the spoke of the wheel, the weight can be further reduced in diameter. Therefore, even under a situation where a centrifugal force applied by routine driving of the automobile is not that much large, the weight can be moved and the tire can be sufficiently filled with the air.

The weight may be made of a material containing tungsten. In this case, a specific gravity of the weight can be increased. Therefore, since it is possible to obtain the weight having a heavy weight while maintaining a thin state of the weight, the movement of the weight caused by centrifugal force can be more sufficiently performed. Since the weight that is reduced in diameter and that has a large weight can be moved, the tire can be more sufficiently filled with the air.

The first support portion may be formed of one or a plurality of plate-shaped members of which the number is adjustable. A movement distance of the weight in the axial direction may be adjusted by adjusting the number of the plate-shaped members. In this case, the first support portion that supports the end portion of the first spring in the axial direction is formed of one or the plurality of plate-shaped members, the first spring biasing the weight to the side opposite the tire, and the movement distance of the weight is adjusted by the number of the plate-shaped members. When the number of the plate-shaped members is small, an extension and contraction length of the first spring is long and the movement distance of the weight increases, and when the number of the plate-shaped members is large, an extension and contraction length of the first spring is short, and the movement distance of the weight decreases. When the movement distance of the weight is large, the maximum air pressure increases, when the movement distance of the weight is small, the maximum air pressure decreases. Therefore, the setting of the maximum air pressure applied to the tire can be changed by adjusting the movement distance of the weight through adjusting the number of the plate-shaped members.

The tire air filling device described above may further include a check valve that prevents a backflow of the air from the inside of the tire into the cylinder. The check valve may be configured separately from the cylinder, and may be provided at a position separated from the cylinder. In this case, since the check valve that is a backflow prevention valve that prevents a backflow of the air into the cylinder is configured separately from the cylinder, the degree of freedom in disposing the check valve can be increased. Therefore, the tire air filling device can be more efficiently disposed in a limited space inside the wheel.

The tire air filling device described above may further include a filter that allows the air to flow into and out of the cylinder, and that suppresses an inflow of foreign matter other than the air into the cylinder. In this case, the air flows into and out of the cylinder through the filter. The filter can suppress the intrusion of foreign matter into the cylinder, and suppress an outflow of foreign matter to the outside of the cylinder. Therefore, for example, it is possible to suppress the problem that foreign matter moves to grease on a portion where the first sealing member is disposed, to decrease sealability.

The weight may include a protrusion around which the first spring is wound and which protrudes in the axial direction. In this case, since the first spring can be supported by the protrusion of the weight, the first spring can be more stably extended and contracted. Since the weight moves stably, the air can be stably supplied to the tire. Since the weight can be made heavier by the weight of the protrusion, the weight can be more easily moved by centrifugal force. Therefore, the air can be further sufficiently supplied to the tire.

Advantageous Effects of Invention

According to the present disclosure, the air can be sufficiently supplied to the tire.

DESCRIPTION OF EMBODIMENTS

Figure 1:
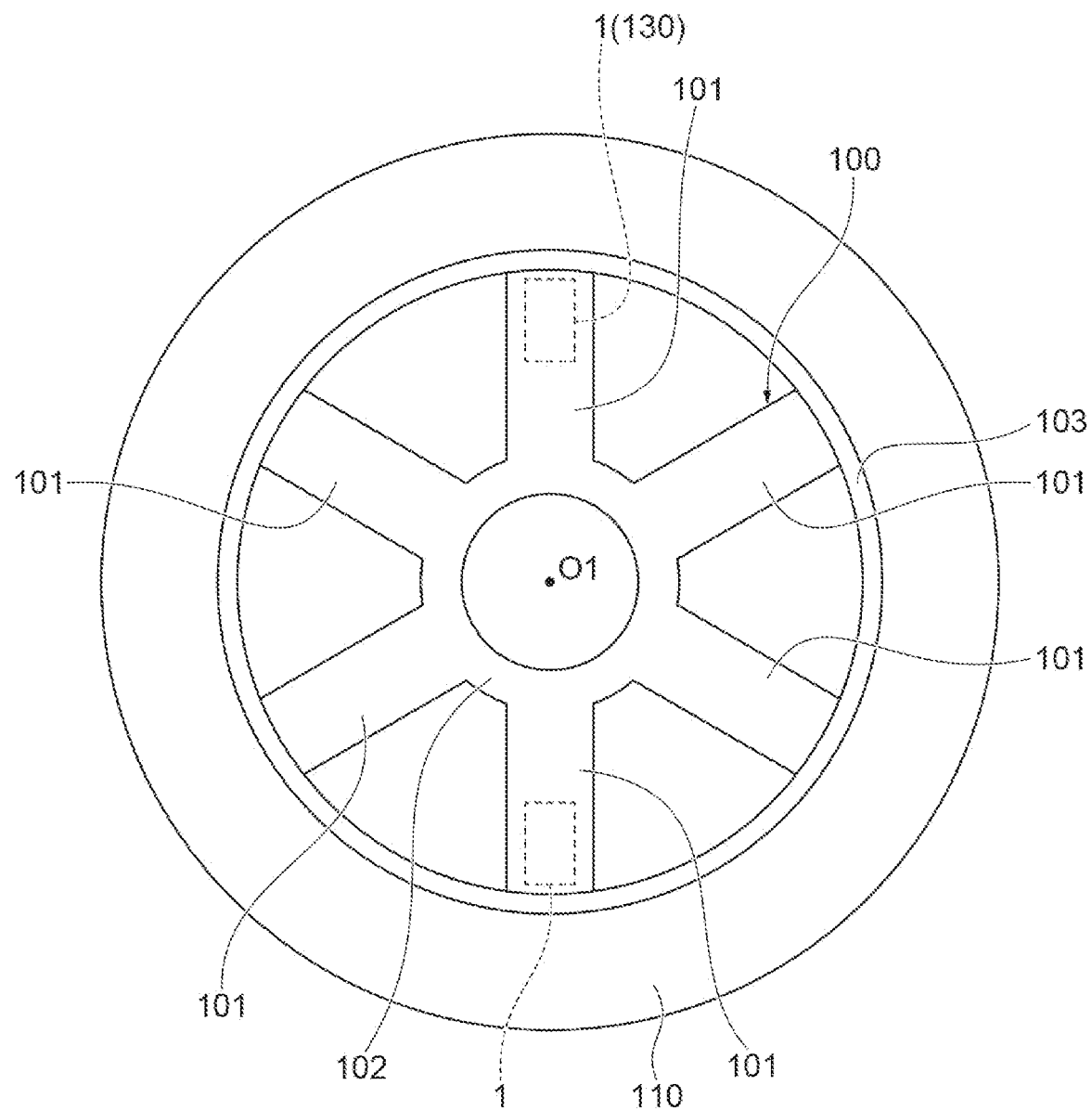
FIG. 1 is a side view showing an example of a wheel and a tire to which a tire air filling device according to an embodiment is attached.

Hereinafter, embodiments of a tire air filling device according to the present disclosure will be described with reference to the drawings. In the description of the drawings, the same or corresponding elements are denoted by the same reference signs, and repeat descriptions will be omitted as appropriate. The drawings may be depicted in a partially simplified or exaggerated manner for ease of understanding, and dimensional ratios and the like are not limited to those specified in the drawings.

FIG. 1 shows an example of wheel 100 and a tire 110 into which a tire air filling device 1 according to the present embodiment is built. For example, a plurality of the wheels 100 and a plurality of the tires 110 are provided in an automobile, and each of the wheels 100 and each of the tires 110 rotate as the automobile travels.

The wheel 100 includes a plurality of spokes 101, and the plurality of spokes 101 extend radially from a central portion 102 of the wheel 100. A rim 103 of the wheel 100 is provided on a radially outer side of the plurality of spokes 101, and the tire 110 is attached to the rim 103.

The tire air filling device 1 is attached to one of the plurality of spokes 101, and is provided, for example, at an end portion on the radially outer side of the spoke 101. Accordingly, the tire air filling device 1 receives a centrifugal force as the automobile travels and the wheel 100 and the tire 110 rotate. The tire air filling device 1 generates compressed air from the centrifugal force received during acceleration and deceleration of the automobile, and fills the inside of the tire 110 with the compressed air.

The wheel 100 may include one tire air filling device 1 or may include a plurality of the tire air filling devices 1. When the plurality of tire air filling devices 1 are provided, for example, the plurality of tire air filling devices 1 are disposed at respective positions symmetric with respect to a center O1 of the wheel 100. In this case, a weight balance in the wheel 100 and the tire 110 can be ensured.

A counterweight 130 may be attached at a position symmetric to the tire air filling device 1 with respect to the center O1 of the wheel 100. A weight of the counterweight 130 is, for example, the same as a weight of the tire air filling device 1. In this case as well, a weight balance in the wheel 100 and the tire 110 can be ensured.

Figure 2:
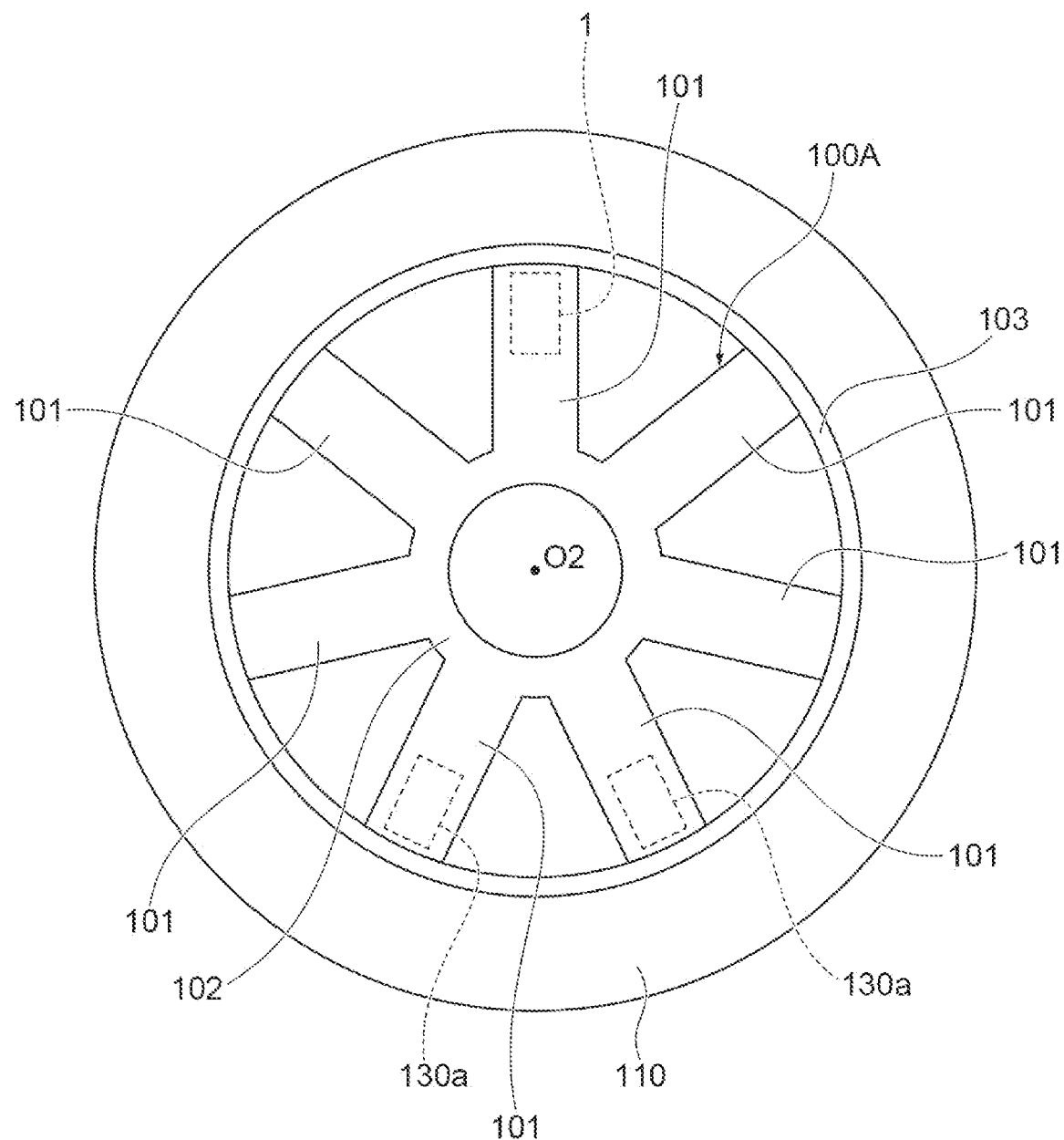
FIG. 2 is a side view showing an example of a wheel and a tire which is different from that of FIG. 1 and to which the tire air filling device according to the embodiment is attached.

FIG. 2 is a view showing an example of wheel 100A in which the number of the spokes 101 is an odd number (7 as one example). In the case of the wheel 100A including an odd number of the spokes 101, the spoke 101 does not exist at a position symmetric to the tire air filling device 1 with respect to a center O2 of the wheel 100A. For this reason, counterweights 130a may be attached to a plurality of the spokes 101 that are located opposite the tire air filling device 1 when viewed from the center O2. A weight balance in the wheel 100A and the tire 110 can be ensured by adjusting a resultant moment of the wheel 100A through attaching a plurality of the counterweights 130a to the plurality of respective spokes 101 in such a manner.

Figure 3:
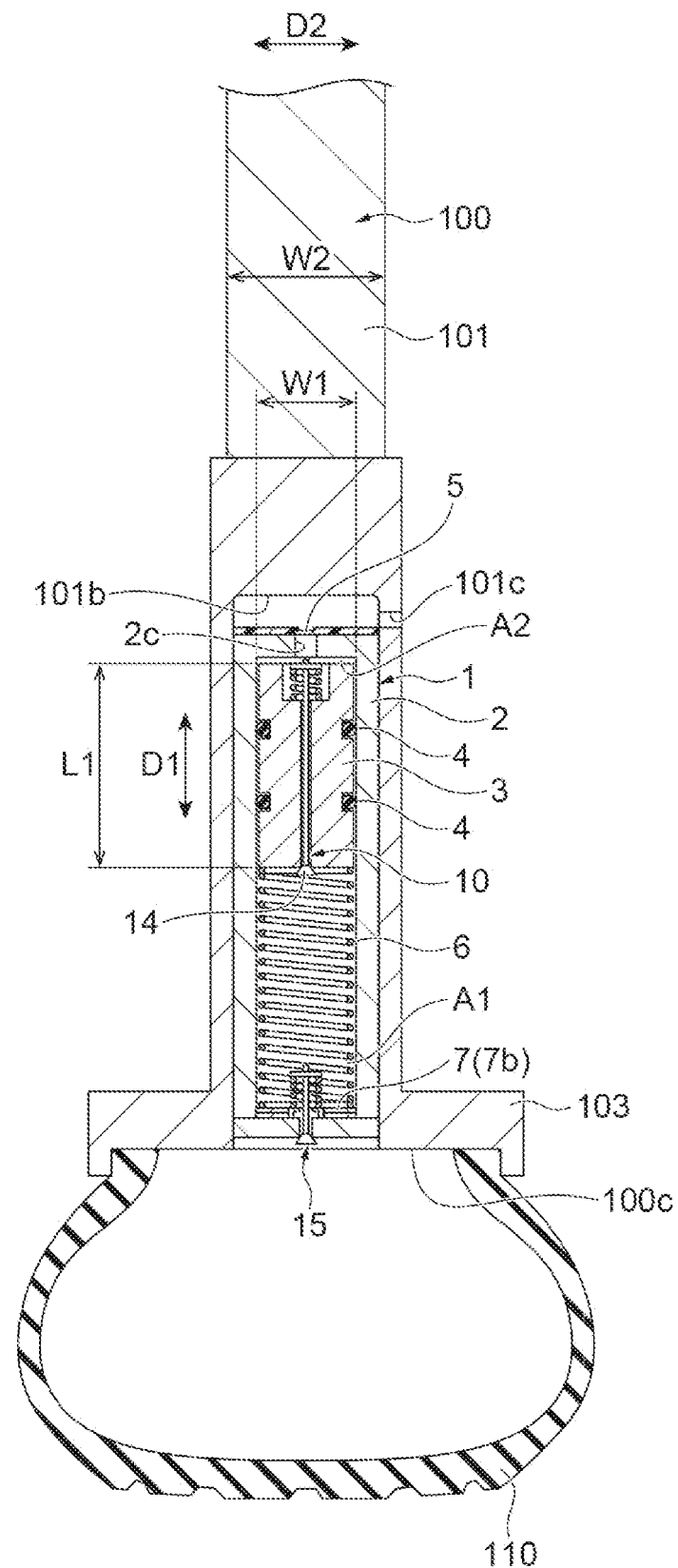
FIG. 3 is a longitudinal sectional view schematically showing the tire air filling device according to the embodiment, spokes of the wheel, and the tire.

FIG. 3 is a sectional view showing the example of tire air filling device 1 attached to the spoke 101 of the wheel 100.

As shown in FIG. 3, the tire air filling device 1 is built into the wheel 100 that is, for example, an aluminum wheel. As a specific example, the tire air filling device 1 is fixed inside a recessed portion 101b formed in the spoke 101 having a plate shape.

For example, the wheel 100 includes the rim 103 functioning as a holding portion that holds the tire 110 on the radially outer side of the spokes 101. The tire air filling device 1 may be disposed to extend inward from the rim 103 in a radial direction. With respect to the wheel 100, the tire air filling device 1 does not include a portion protruding outward (lower side in FIG. 3) from the wheel 100 in the radial direction. The tire air filling device 1 is disposed on the same plane as an outer periphery 100c of the wheel 100, or is disposed to be inserted closer to a radially inner side of the wheel 100 than the outer periphery 100c. Accordingly, it is possible to reduce a possibility that the tire air filling device 1 interferes with other components such as the tire 110 when the tire 110 is replaced.

Figure 4:
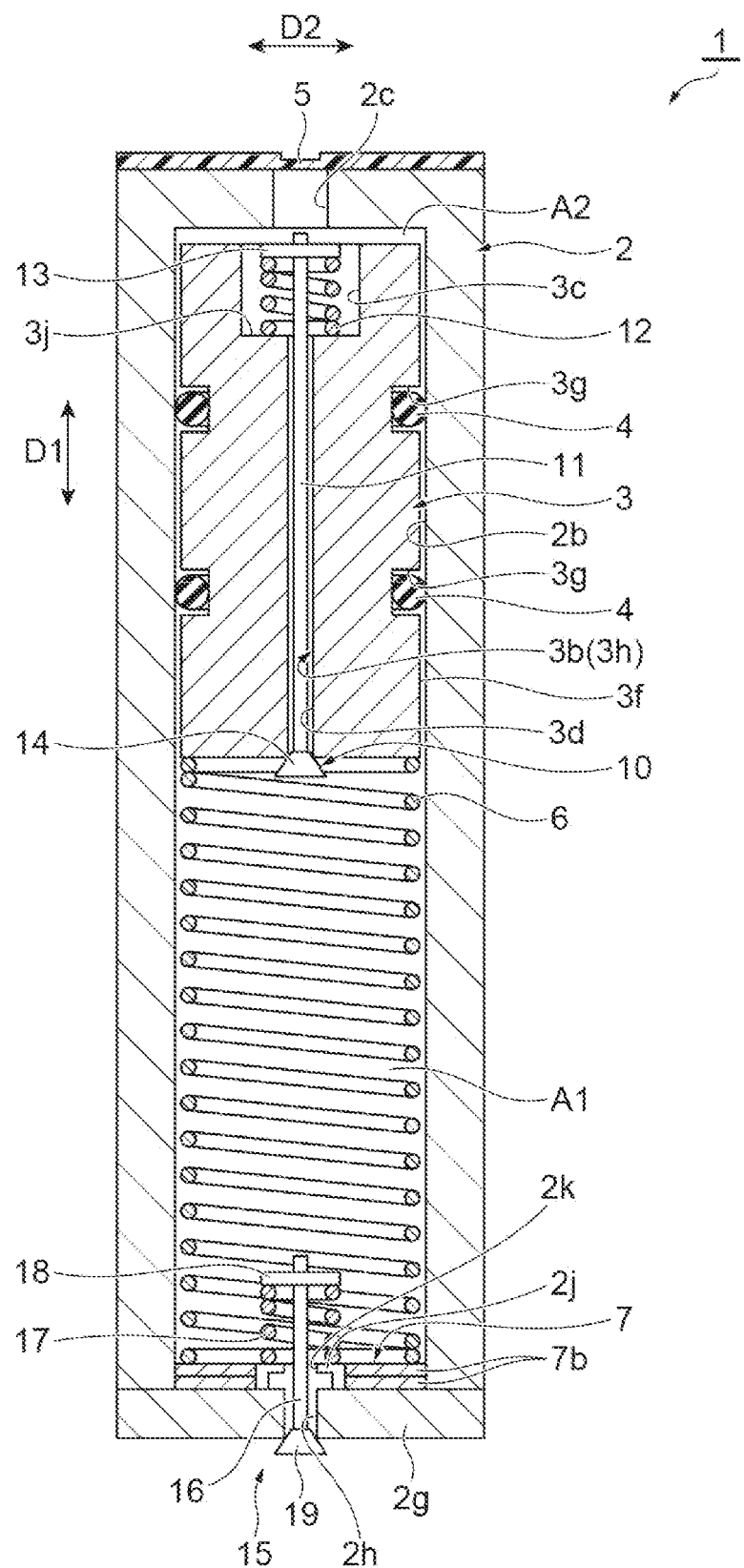
FIG. 4 is a longitudinal sectional view showing the tire air filling device of FIG. 3.

FIG. 4 is a longitudinal sectional view of the tire air filling device 1, in which the tire air filling device 1 of FIG. 3 is enlarged. As shown in FIGS. 3 and 4, the tire air filling device 1 includes a cylinder 2 having a bottomed cylindrical shape; a weight 3 disposed to be movable along an axial direction D1 of the cylinder 2 inside the cylinder 2; and first sealing members 4 interposed between an inner surface 2b of the cylinder 2 and the weight 3. As one example, grease may be applied between the first sealing members 4 and the inner surface 2b.

The cylinder 2 is fixed to the spoke 101 of the wheel 100. For example, a width W1 of the weight 3 in a direction D2 orthogonal to the axial direction D1 is smaller than a width W2 of the spoke 101. As one example, the weight 3 has a columnar shape. In this case, the width W1 corresponds to a diameter of the weight 3.

A length of the width W1 is, for example, from 5 mm to 15 mm. As described above, since the width W1 is small, air pressure caused by a movement of the weight 3 in the axial direction D1 can be effectively increased. A length L1 of the weight 3 in the axial direction D1 is, for example, from 20 mm to 45 mm. Since the length L1 is 45 mm or less, a large movement distance of the weight 3 inside the cylinder 2 can be ensured. However, the values of the width W1 and of the length L1 are not limited to the above examples.

The weight 3 and the first sealing members 4 divide an internal region of the cylinder 2 into a first region A1 on a tire 110 side and a second region A2 opposite the tire 110. The weight 3 and the first sealing members 4 reciprocate inside the cylinder 2 in the radial direction (up-down direction in FIGS. 3 and 4) of the wheel 100.

The cylinder 2 has, for example, a circular cylindrical shape. The cylinder 2 has an inlet 2c through which air can flow into the second region A2 of the cylinder 2. A filter 5 is attached to the inlet 2c. The inlet 2c and the filter 5 are provided opposite the tire 110 (on an upper side in FIGS. 3 and 4) when viewed from the weight 3. The filter 5 is, for example, a filter that allows the passing of gas such as air and that prevents the passing of liquid and solid.

As one example, the filter 5 is made of a membrane material that is a composite of a polyurethane polymer and a film obtained by elongating polytetrafluoroethylene (PTFE, Teflon (registered trademark)). The inlet 2c of the cylinder 2 communicates with the recessed portion 101b described above. A through-hole 101c penetrating through the wheel 100 is formed in the recessed portion 101b.

Air flows into the weight 3 through the through-hole 101c of the spoke 101, through the recessed portion 101b, and through the filter 5. The weight 3 has, for example, a columnar shape. A pair of annular recessed portions 3g arranged along the axial direction D1 are formed in an outer peripheral surface 3f of the weight 3. The first sealing member 4 is inserted into each of the annular recessed portions 3g. The first sealing member 4 is, for example, an O-ring.

An air flow hole 3b through which the air that has flowed in flows opposite the inlet 2c is formed in the weight 3. For example, the air flow hole 3b includes a first space portion 3c located on an inlet 2c side, and a second space portion 3d extending from the first space portion 3c to the tire 110 side (lower side in FIGS. 3 and 4). As one example, the first space portion 3c is more increased in diameter than the second space portion 3d.

The weight 3 is made of, for example, a material containing tungsten. The weight 3 may be made of tungsten or a tungsten alloy. The weight 3 is, for example, a high specific gravity material having a higher specific gravity than that of the cylinder 2. As one example, a specific gravity of the weight 3 is 15 $g/cm^3$ or more. In this case, it is possible to increase a mass of the weight 3 while realizing a reduction in the diameter of the weight 3. Therefore, the reciprocation of the weight 3 in the axial direction D1 caused by centrifugal force can be sufficiently performed. As a result, the air can be more sufficiently supplied to the tire 110.

The tire air filling device 1 includes a first spring 6 disposed to extend from the weight 3 to the tire 110 side, and a first support portion 7 located between the first spring 6 and a wall portion 2g of the cylinder 2. The first spring 6 is a coil spring that biases the weight 3 to a side opposite the tire 110.

The first support portion 7 is formed of, for example, one or a plurality of plate-shaped members 7b each having an annular shape. The plate-shaped members 7b can be stacked along the axial direction D1. A movement distance of the weight 3 is determined according to the number of the plate-shaped members 7b stacked along the axial direction D1. Specifically, the smaller the number of the plate-shaped members 7b is, the longer the movement distance of the weight 3 is, and the larger the number of the plate-shaped members 7b is, the shorter the movement distance of the weight 3 is. When the movement distance of the weight 3 is long, the maximum air pressure of the air to the tire 110 increases, and when the movement distance of the weight 3 is short, the maximum air pressure of the air to the tire 110 decreases. Therefore, the maximum air pressure is adjustable by adjusting the number of the plate-shaped members 7b.

The tire air filling device 1 includes a backflow prevention valve 10 that prevents a backflow of the air from the weight 3 to the side opposite the tire 110. The backflow prevention valve 10 includes, for example, a slide member 11, a second spring 12, a second support portion 13, and a second sealing member 14. The slide member 11 slides in the air flow hole 3b in the axial direction D1. The second spring 12 biases the slide member 11 to the side opposite the tire 110. The second support portion 13 supports an end portion of the second spring 12 in the axial direction D1. The second sealing member 14 is interposed between an inner surface 3h of the air flow hole 3b and the slide member 11.

For example, the slide member 11 is provided to penetrate through the air flow hole 3b (the first space portion 3c and the second space portion 3d) of the weight 3 in the axial direction D1. As one example, the slide member 11 has a rod shape extending along the axial direction D1. The second spring 12 is provided, for example, in the first space portion 3c.

For example, the second spring 12 is a coil spring. As one example, the second spring 12 extends in the axial direction D1 between the second support portion 13 and a bottom surface 3j of the first space portion 3c facing the axial direction D1. The second spring 12 is disposed outside the slide member 11 in a radial direction. The second support portion 13 has a plate shape extending in the direction D2 orthogonal to the axial direction D1.

The second sealing member 14 is provided at an end portion on the tire 110 side of the slide member 11, and is increased in diameter at the end portion. The second sealing member 14 is provided, for example, at an outlet on the tire 110 side of the air flow hole 3b, and opens and closes the outlet as the slide member 11 moves with respect to the weight 3. Specifically, when the slide member 11 has moved to the tire 110 side with respect to the weight 3, the second sealing member 14 opens the air flow hole 3b. On the other hand, when the slide member 11 has moved opposite the tire 110 with respect to the weight 3, the second sealing member 14 closes the air flow hole 3b.

The cylinder 2 has an opening 2h facing the tire 110 side, and a check valve 15 that prevents a backflow of the air into the cylinder 2 is provided at the opening 2h. For example, the check valve 15 is attached to a protrusion portion 2j with an opening 2k that protrudes to the inside of the cylinder 2 when viewed from the opening 2h of the cylinder 2. The check valve 15 has, for example, the same configuration as that of the backflow prevention valve 10 described above.

As a specific example, the check valve 15 includes a slide member 16, a third spring 17, a third support portion 18, and a third sealing member 19. The slide member 16 slides in the axial direction D1 in a state where the slide member 16 has passed through the opening 2h and through the opening 2k. The third spring 17 biases the slide member 16 to the side opposite the tire 110. The third support portion 18 supports an end portion of the third spring 17 in the axial direction D1. The third sealing member 19 is interposed between the opening 2h and the slide member 16.

For example, the slide member 16 is provided to penetrate through the opening 2h and the opening 2k of the cylinder 2 and through in the axial direction D1. As one example, the slide member 16 has a rod shape extending along the axial direction D1. The third spring 17 extends in the axial direction D1 between the protrusion portion 2j and the third support portion 18. For example, the third spring 17 is a coil spring. The third spring 17 is disposed, for example, outside the slide member 16 in the radial direction. The third support portion 18 has a plate shape extending in the direction D2.

The third sealing member 19 is provided, for example, at an end portion on the tire 110 side of the slide member 16, and is increased in diameter at the end portion. As one example, the third sealing member 19 is provided on a tire 110 side of the opening 2h of the cylinder 2. The third sealing member 19 opens and closes the opening 2h as the slide member 16 moves with respect to the cylinder 2. Specifically, when the slide member 16 has moved to the tire 110 side with respect to the cylinder 2, the third sealing member 19 opens the opening 2h. On the other hand, when the slide member 16 has moved opposite the tire 110 with respect to the cylinder 2, the third sealing member 19 closes the opening 2h.

Next, an example of operation of the tire air filling device 1 will be described. When the automobile is stopped, as shown in FIG. 4, the weight 3 is located on an upper side of the cylinder 2 (radially inner side of the wheel 100) by a biasing force of the first spring 6. At this time, the slide member 11 inside the weight 3 is located on an upper side of the weight 3 by a biasing force of the second spring 12, and the second sealing member 14 closes the air flow hole 3b. Then, the slide member 16 inside the cylinder 2 is located on an upper side by a biasing force of the third spring 17, and the third sealing member 19 closes the opening 2h.

Figure 5:
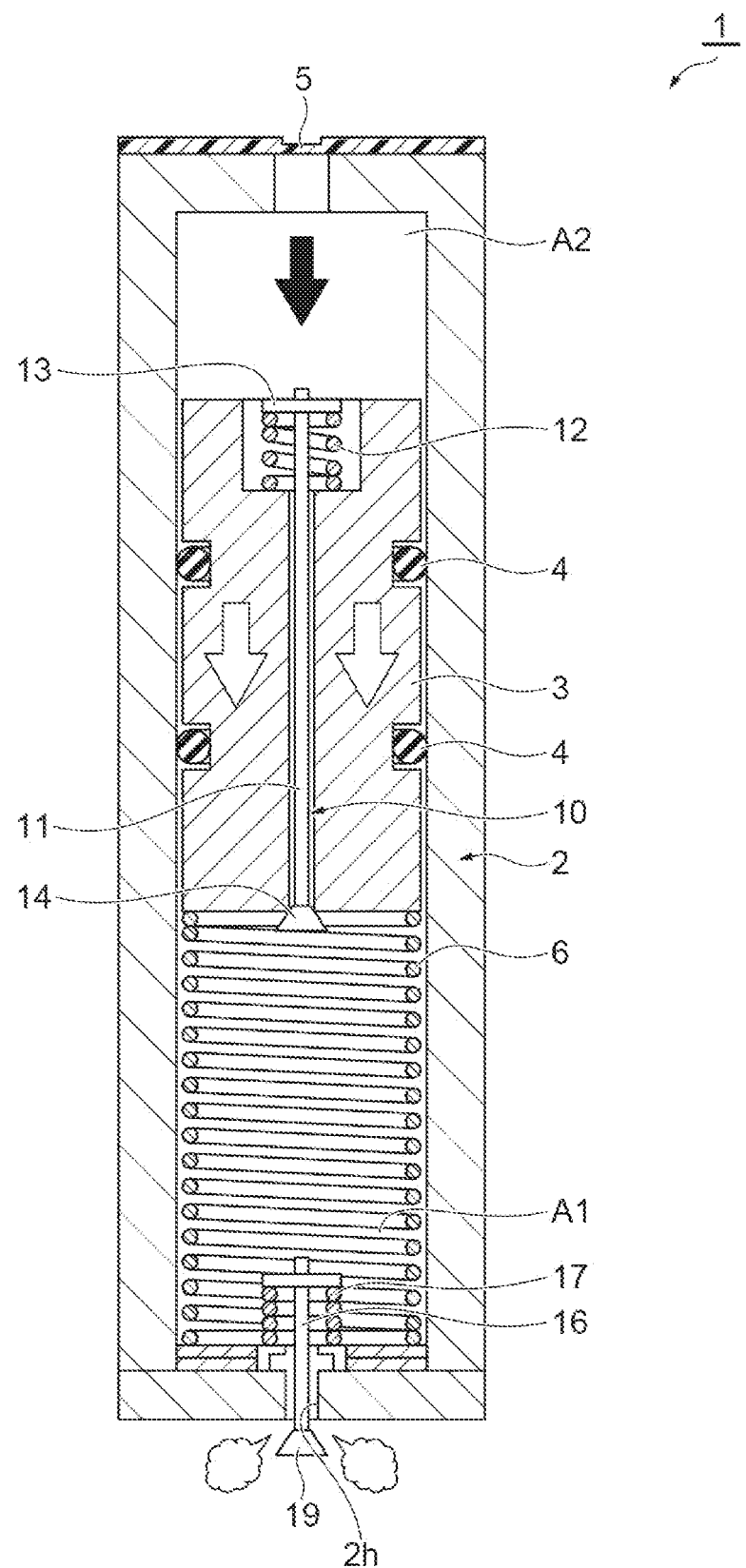
FIG. 5 is a longitudinal sectional view showing operation of the tire air filling device of FIG. 3 when a vehicle accelerates.

When the automobile accelerates, as shown in FIG. 5, the weight 3 receives a centrifugal force caused by rotation of the wheel 100, to move to a lower side of the cylinder 2 (radially outer side of the wheel 100) against the biasing force of the first spring 6. At this time, the slide member 16 inside the cylinder 2 moves to the lower side against the biasing force of the third spring 17, and the third sealing member 19 opens the opening 2h. The air in the first region A1 of the cylinder 2 is injected to the inside of the tire 110 by opening of the opening 2h. When the weight 3 moves to the lower side of the cylinder 2, the air enters the second region A2 of the cylinder 2 from the filter 5.

Figure 6:
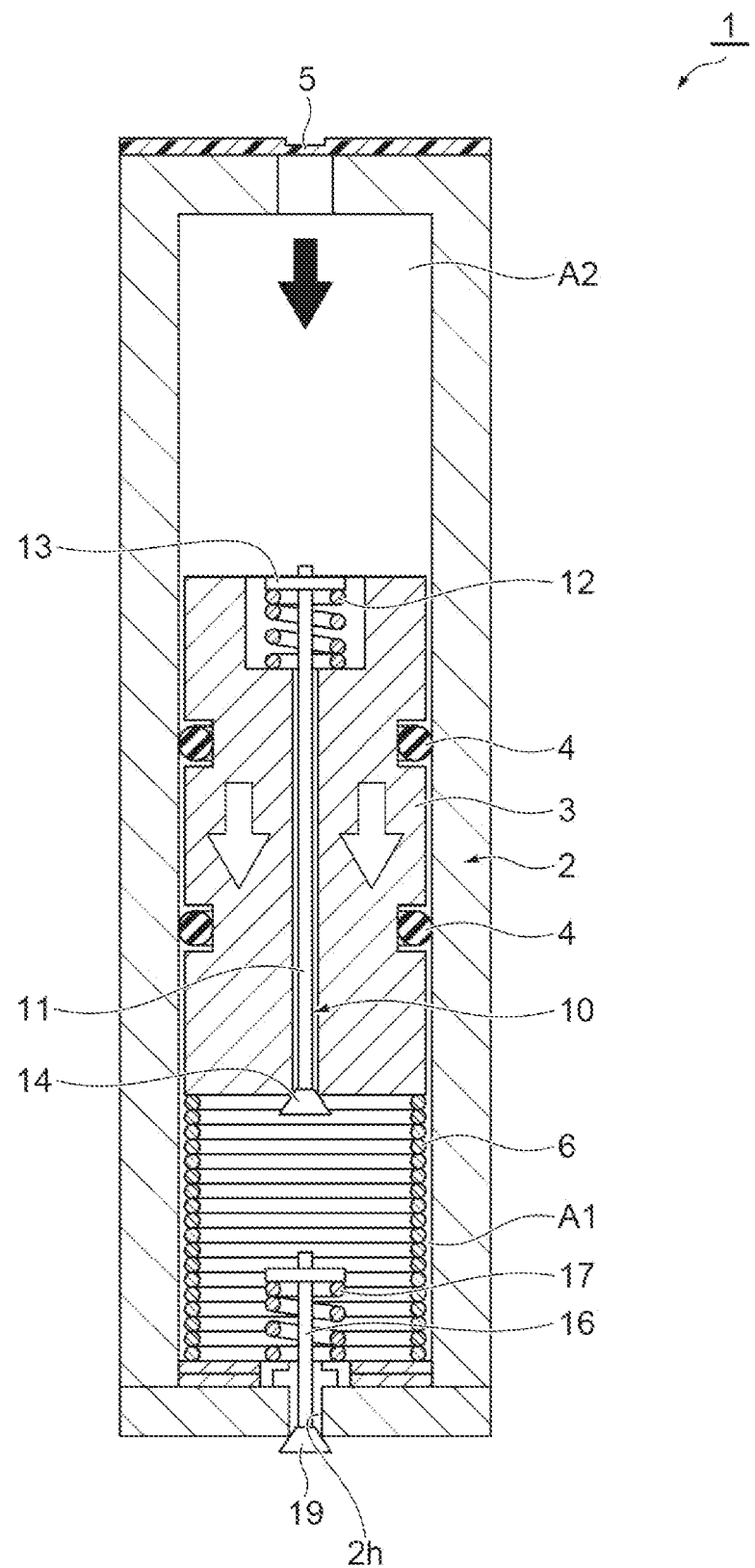
FIG. 6 is a longitudinal sectional view showing operation of the tire air filling device of FIG. 3 when a vehicle travels.

For example, when the automobile travels at a speed of 40 km/h, as shown in FIG. 6, a state where the weight 3 is located down and the first spring 6 is compressed is maintained. As one example, at this time, a compression space pressure of the first spring 6 (air pressure of the first region A1) becomes a maximum air pressure (as one example, 2.4 kgf/cm$^2$) of the tire 110.

When an air pressure of the tire 110 is lower than an air pressure of the first region A1, the third sealing member 19 opens the opening 2h of the cylinder 2, and the air is supplied from the first region A1 to the inside of the tire 110. On the other hand, when the air pressure of the tire 110 is equal to or more than the air pressure of the first region A1, the third sealing member 19 closes the opening 2h, and the air is not supplied to the tire 110.

Figure 7:
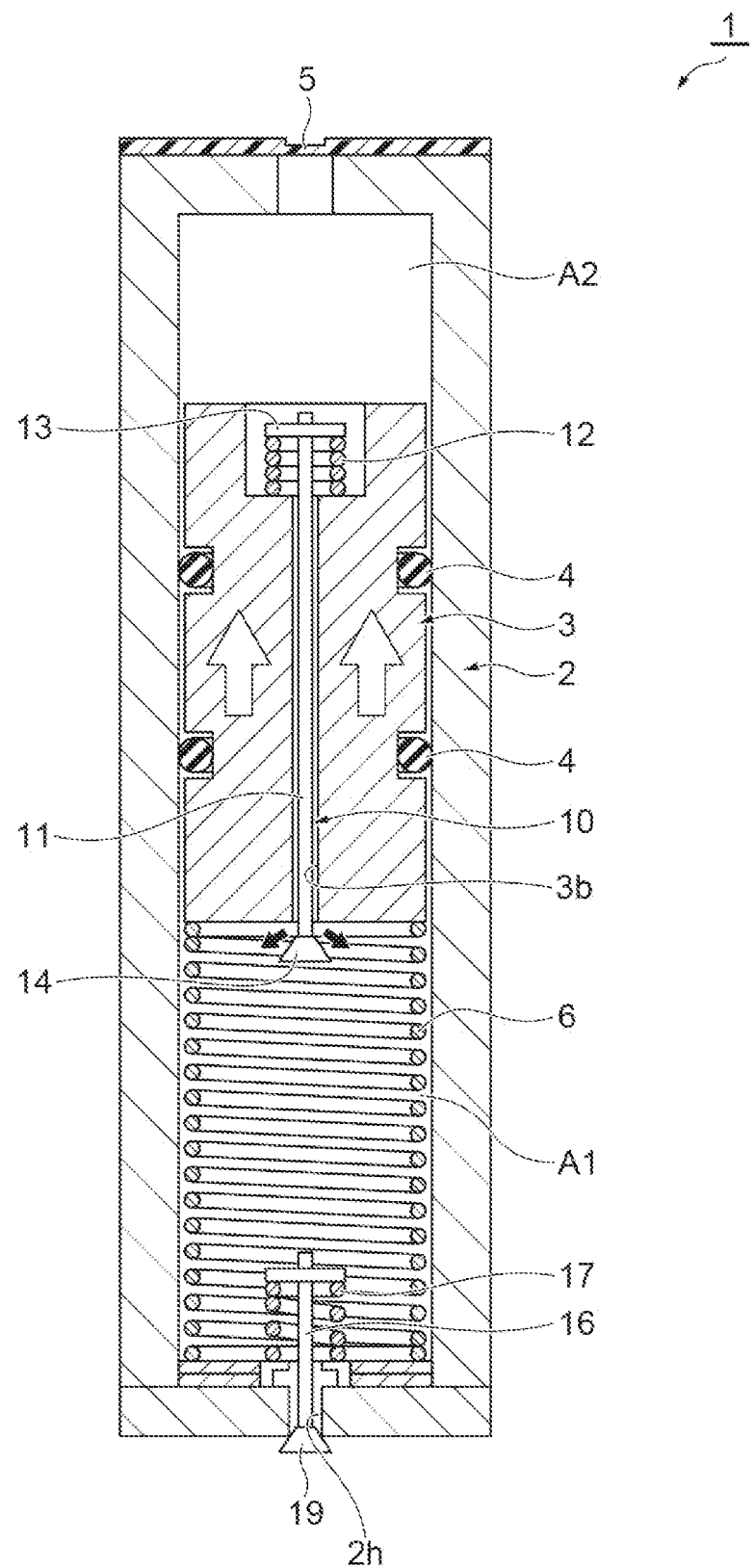
FIG. 7 is a longitudinal sectional view showing operation of the tire air filling device of FIG. 3 when a vehicle decelerates.

When the automobile decelerates, as shown in FIG. 7, centrifugal force caused by rotation of the wheel 100 decreases, and the weight 3 is moved to the upper side of the cylinder 2 by the biasing force of the first spring 6. At this time, the slide member 11 inside the weight 3 moves to the lower side with respect to the weight 3 against the biasing force of the second spring 12, and the second sealing member 14 opens the air flow hole 3b. The air of the second region A2 of the cylinder 2 enters the first region A1 through the air flow hole 3b due to opening of the air flow hole 3b. When the automobile is stopped, the tire air filling device 1 returns to an initial state shown in FIG. 4.

Next, actions and effects obtained from the tire air filling device 1 will be described. In the tire air filling device 1, the weight 3 that is moved in the axial direction D1 of the cylinder 2 by centrifugal force to cause the air to be supplied to the inside of the tire 110 is provided inside the cylinder 2. The weight 3 receives a centrifugal force generated by acceleration or deceleration of rotation of the tire 110, to move and cause the air to be supplied to the inside of the tire 110. Therefore, the tire 110 can be automatically filled with the air as the automobile travels. The tire 110 is filled with the air through the movement of the weight 3, so that the tire 110 can be automatically filled with the air even without an electric circuit and the like.

The tire air filling device 1 includes the backflow prevention valve 10. The backflow prevention valve 10 includes the slide member 11, the second spring 12, the second support portion 13, and the second sealing member 14. The slide member 11, the second spring 12, and the second support portion 13 are disposed inside the weight 3.

Therefore, instead of an umbrella-shaped valve such as an umbrella valve, the backflow prevention valve 10 is configured to include the second spring 12 that is a coil spring, and each part of the backflow prevention valve 10 is provided inside the weight 3. As described above, the weight 3 can be reduced in diameter by providing each part of the backflow prevention valve 10 including the second spring 12 that is a coil spring, inside the weight 3. Therefore, since the weight 3 that is reduced in diameter can be sufficiently moved by a small load according to Pascal's principle, the air can be sufficiently supplied to the tire 110. As a result, the weight 3 can be sufficiently moved and the air can be sufficiently supplied to the tire 110 merely by routine traveling of the automobile at a speed of 50 km/h or less.

As shown in FIG. 3, the cylinder 2 is fixed to the spoke 101 of the wheel 100, and the width W1 of the weight 3 in the direction D2 orthogonal to the axial direction D1 may be smaller than the width W2 of the spoke 101. In this case, since the width W1 of the weight 3 is thinner than the width W2 of the spoke 101 of the wheel 100, the weight 3 can be further reduced in diameter. Therefore, even under a situation where a centrifugal force applied by routine driving of the automobile is not that much large, the weight 3 can be moved and the tire 110 can be sufficiently filled with the air.

The weight 3 may be made of, for example, a material containing tungsten. In this case, the specific gravity of the weight 3 can be increased. Therefore, since it is possible to make the weight 3 heavy while maintaining a thin state of the weight 3, the movement of the weight 3 caused by centrifugal force can be more sufficiently performed. Since the weight 3 that is reduced in diameter and that has a large weight can be moved, the tire 110 can be more sufficiently filled with the air.

The first support portion 7 is formed of one or the plurality of plate-shaped members 7b of which the number is adjustable. The movement distance of the weight 3 in the axial direction D1 may be adjusted by adjusting the number of the plate-shaped members 7b. In this case, the first support portion 7 that supports an end portion of the first spring 6 in the axial direction D1 is formed of one or the plurality of plate-shaped members 7b, the first spring 6 biasing the weight 3 to the side opposite the tire 110, and the movement distance of the weight 3 is adjusted by the number of the plate-shaped members 7b. The plate-shaped member 7b may be, for example, a washer.

When the number of the plate-shaped members 7b is small, an extension and contraction length of the first spring 6 is long, and the movement distance of the weight 3 increases, and when the number of the plate-shaped members 7b is large, an extension and contraction length of the first spring 6 is short, and the movement distance of the weight 3 decreases. When the movement distance of the weight 3 is large, the maximum air pressure increases, and when the movement distance of the weight 3 is small, the maximum air pressure decreases. Therefore, the setting of the maximum air pressure applied to the tire 110 can be changed by adjusting the movement distance of the weight 3 through adjusting the number of the plate-shaped members 7b.

The tire air filling device 1 may include the filter 5 that allows the air to flow into and out of the cylinder 2 and that suppresses an inflow of foreign matter other than the air into the cylinder 2. In this case, the air flows into and out of the cylinder 2 through the filter 5. The filter 5 can suppress the intrusion of foreign matter into the cylinder 2, and suppress an outflow of foreign matter to the outside of the cylinder 2. Therefore, for example, it is possible to suppress the problem that foreign matter moves to the grease on portions where the first sealing members 4 are disposed, to decrease sealability.

Figure 8:
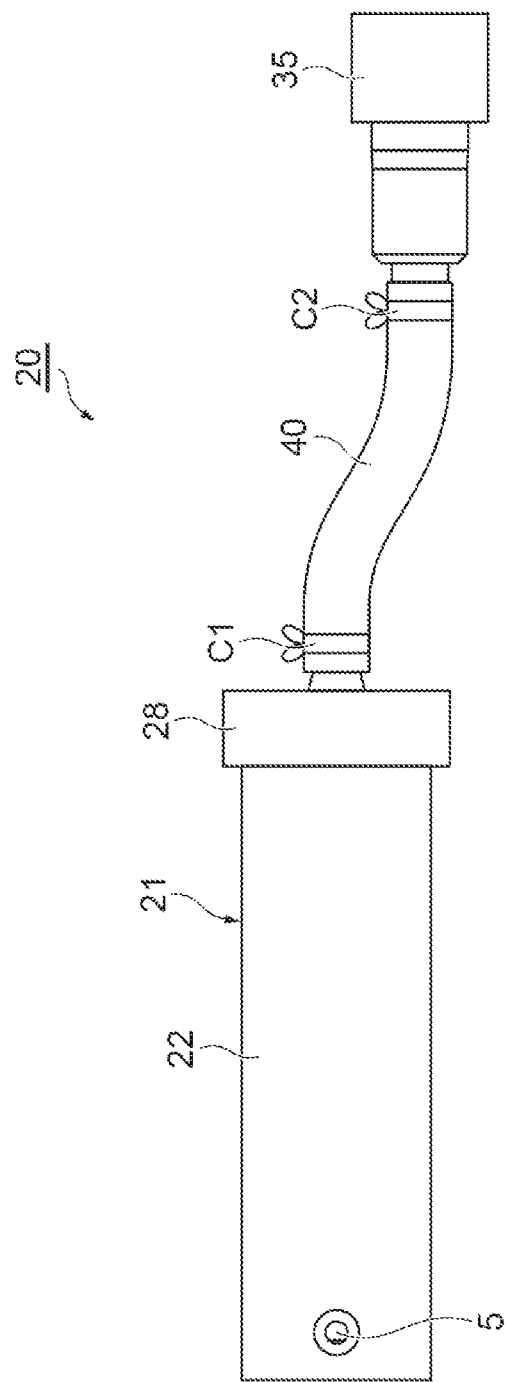
FIG. 8 is a view showing a tire air filling device according to another embodiment.

Next, a tire air filling device 20 according to a modification example will be described with reference to FIG. 8. Since some configurations of the tire air filling device 20 are the same as the configurations of the tire air filling device 1 described above, repeat descriptions from the tire air filling device 1 will be omitted below as appropriate. In the tire air filling device 1, the check valve 15 is integrated with the cylinder 2. However, the tire air filling device 20 includes a check valve 35 configured separately from a cylinder 22, instead of the check valve 15.

The tire air filling device 20 includes a pump 21 that generates compressed air; a hose 40 extending from the pump 21; and the check valve 35 that prevents a backflow of the air from the tire 110 to the tire air filling device 20 (pump 21). For example, the pump 21 has the same function as that of the tire air filling device 1 described above, except for the check valve 15.

The hose 40 connects the pump 21 and the check valve 35 to each other. A length of the hose 40 is, for example, from 2 cm to 3 cm. A reduction air pressure generated by the pump 21 can be suppressed by shortening the length of the hose 40. The hose 40 may be made of a relatively hard material that is unlikely to be deformed. In this case, a reduction in air pressure inside the hose 40 can be suppressed.

Figure 9:
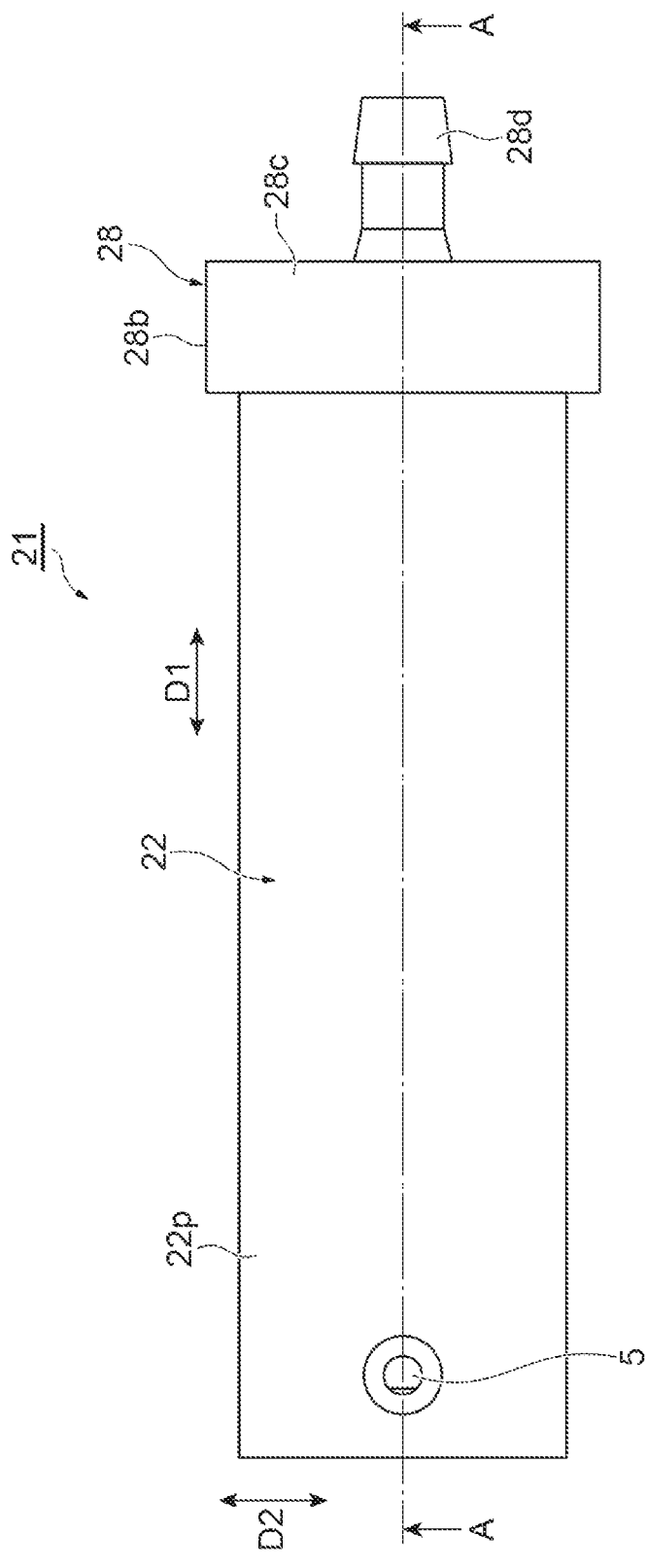
FIG. 9 is a side view showing a pump unit of the tire air filling device of FIG. 8.
Figure 10:
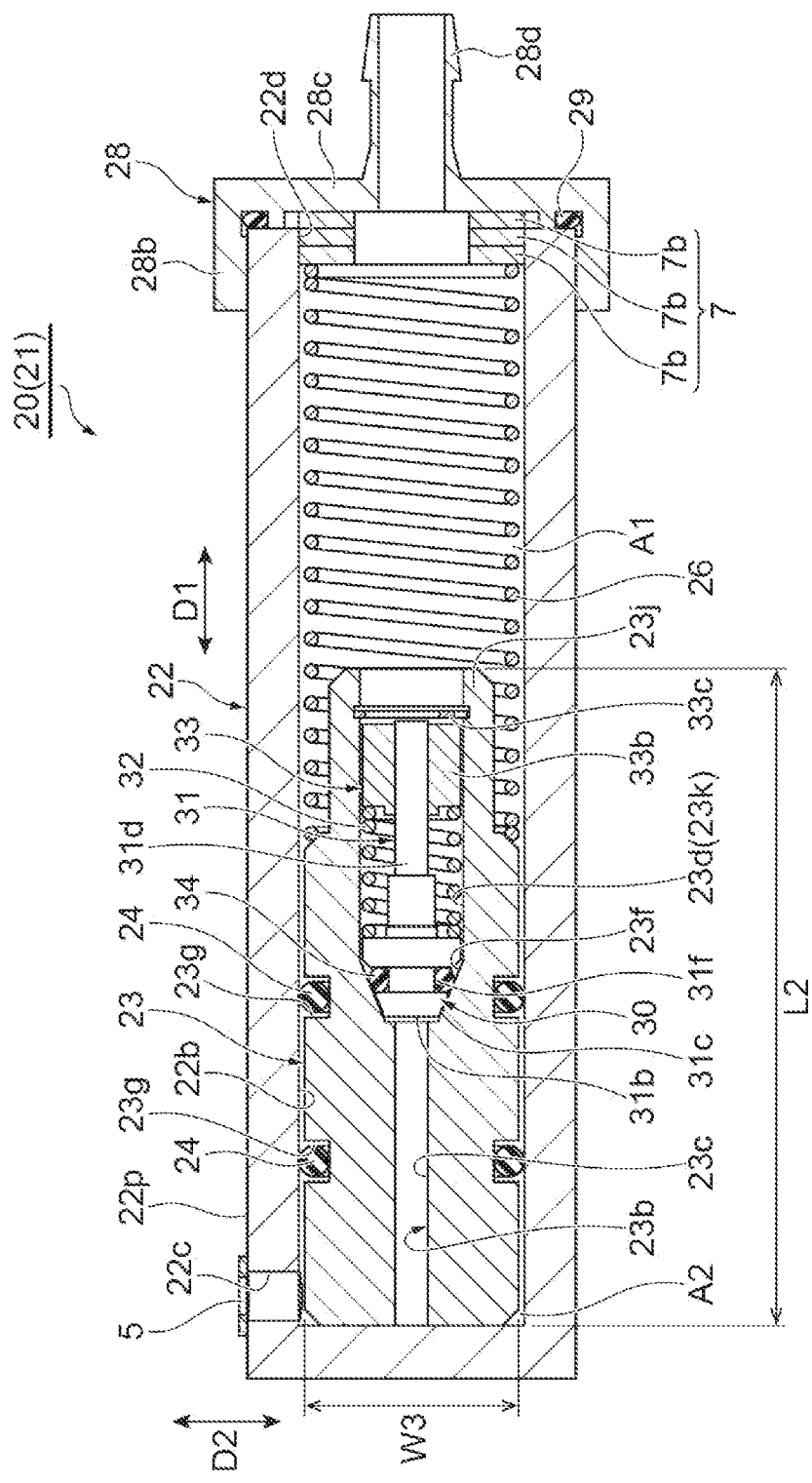
FIG. 10 is a sectional view taken along line A-A of FIG. 9.

FIG. 9 is a side view of the pump 21. FIG. 10 is a sectional view of the pump 21 taken along line A-A. As shown in FIGS. 9 and 10, the pump 21 includes the cylinder 22 having a bottomed cylindrical shape, a weight 23, and first sealing members 24. The weight 23 is disposed to be movable along the axial direction D1 of the cylinder 22 inside the cylinder 22. The first sealing members 24 are interposed between an inner surface 22b of the cylinder 22 and the weight 23.

For example, similarly to the cylinder 2 described above, the cylinder 22 is fixed to the spoke 101 such that the axial direction D1 coincides with a longitudinal direction of the spoke 101. For example, a width W3 (maximum width) of the weight 23 in the direction D2 orthogonal to the axial direction D1 is smaller than the width of the spoke 101. A value of the width W3 is, for example, from 5 mm to 15 mm. A length L2 of the weight 3 in the axial direction D1 is, for example, from 20 mm to 45 mm. However, the values of the width W3 and of the length L2 are not limited to the above examples.

The weight 23 and the first sealing members 24 divide an internal region of the cylinder 22 into the first region A1 on the tire 110 side and the second region opposite the tire 110. The weight 23 and the first sealing members 24 reciprocate inside the cylinder 22 in the radial direction (left-right direction in FIGS. 9 and 10) of the wheel 100.

The cylinder 22 has a bottomed circular cylindrical shape. A material of the cylinder 22 contains, for example, aluminum. The cylinder 22 has an inlet 22c in a side surface 22p, the air being able to flow into the second region A2 through the inlet 22c. For example, the filter 5 that closes the inlet 22c is attached to the side surface 22p of the cylinder 22. The air that has flowed into the cylinder 22 through the filter 5 flows into an air flow hole 23b of the weight 23 through the second region A2.

A pair of annular recessed portions 23g arranged along the axial direction D1 are formed in an outer peripheral surface of the weight 23, and the first sealing member 24 is inserted into each of the annular recessed portions 23g. The first sealing member 24 is, for example, an O-ring. A material of the first sealing member 24 is, for example, ethylene propylene diene (EPDM) rubber. The air flow hole 23b is an air flow path into which the air flows from the second region A2 and through which the air that has flowed in flows to the first region A1.

The air flow hole 23b includes a first space portion 23c located on a second region A2 side, and a second space portion 23d extending from the first space portion 23c to a first region A1 side. The second space portion 23d is more increased in diameter than the first space portion 23c. The second space portion 23d is defined by a tapered surface 23f that is gradually increased in diameter from the first space portion 23c toward the first region A1, and by an inner peripheral surface 23k interposed between the tapered surface 23f and the first region A1. A material of the weight 23 is, for example, the same as the material of the weight 3 described above. The weight 23 may be made of, for example, tungsten or a tungsten alloy.

The pump 21 includes a first spring 26, the first support portion 7, a cap 28, and a fourth sealing member 29. The first spring 26 is disposed to extend from the weight 23 to the tire 110 side. The first support portion 7 is provided on an opposite side of the first spring 26 from the weight 23. The cap 28 closes an opening 22d of the cylinder 22. The fourth sealing member 29 is interposed between the cap 28 and the cylinder 22.

The weight 23 includes a protrusion 23j protruding to the tire 110 side along the axial direction D1, and the first spring 26 is wound around the protrusion 23j. Accordingly, an end portion of the first spring 26 in the axial direction D1 can be stably supported. Since the protrusion 23j protruding in the axial direction D1 is provided, it is possible to make the weight 23 heavy while suppressing an increase in the size of the weight 23 in the radial direction.

The first spring 26 biases the weight 23 to the side opposite the tire 110 (left side in FIGS. 9 and 10). A material of the first spring 26 is, for example, steel use stainless (SUS). A material of the cap 28 contains, for example, aluminum. The cap 28 includes a side surface portion 28b that covers the side surface 22p of the cylinder 22 from the outside in the radial direction; a sealing portion 28c having a plate shape that seals the opening 22d; and a cylindrical portion 28d protruding from the sealing portion 28c in the axial direction D1.

The fourth sealing member 29 is provided inside between the side surface portion 28b of and the sealing portion 28c of the cap 28. The fourth sealing member 29 is, for example, an O-ring. The fourth sealing member 29 is made of for example, EPDM. The first support portion 7 is provided inside the sealing portion 28c. One or a plurality of the plate-shaped members 7b are interposed between the first spring 26 and the sealing portion 28c. One end of the hose 40 is connected to the cylindrical portion 28d by fitting the hose 40 described above with a clamp C1 (refer to FIG. 8).

The pump 21 includes a backflow prevention valve 30 that prevents a backflow of the air from the weight 23 to the second region A2. The backflow prevention valve 30 includes a slide member 31, a second spring 32, a second support portion 33, and a second sealing member 34. The slide member 31 slides in the air flow hole 23b in the axial direction D1. The second spring 32 biases the slide member 31 to the side opposite the tire 110. The second support portion 33 supports an end portion of the second spring 32 in the axial direction D1. The second sealing member 34 is interposed between an inner surface of the air flow hole 23b and the slide member 31. The second support portion 33 includes, for example, a collar 33*b* and a retaining member 33*c*. The retaining member 33*c* is, for example, a C-ring.

The slide member 31 is made of, for example, aluminum. The slide member 31 slides in the second space portion 23*d* of the air flow hole 23*b* along the axial direction D1. The slide member 31 includes an end surface 31*b* facing the first space portion 23*c*, and an inclined surface 31*c* extending from the end surface 31*b* along the tapered surface 23*f*. Further, the slide member 31 includes a shaft portion 31*d* which extends from the inclined surface 31*c* toward the second support portion 33 and of which a part is inserted into the second support portion 33.

An annular recessed portion 31*f* is formed in the inclined surface 31*c* of the slide member 31, and the second sealing member 34 is inserted into the annular recessed portion 31*f*. The second sealing member 34 is, for example, an O-ring. A material of the second sealing member 34 is made of, for example, EPDM. Grease may be applied between the second sealing member 34 and the inner surface of the air flow hole 23*b*.

The second spring 32 is made of, for example, SUS. The second spring 32 is provided in the second space portion 23*d*. The second spring 32 is disposed outside the shaft portion 31*d* of the slide member 31 in the radial direction, and extends in the axial direction D1 between the slide member 31 and the second support portion 33.

The collar 33*b* is made of, for example, aluminum. The collar 33*b* is a bearing for the shaft portion 31*d* of the slide member 31. The retaining member 33*c* is provided on a first region A1 side of the collar 33*b*. The retaining member 33*c* is made of, for example, SUS. The retaining member 33*c* functions to prevent the slide member 31, the second spring 32, the collar 33*b*, and the second sealing member 34 from coming off from the air flow hole 23*b*. In the tire air filling device 20, the slide member 31, the second spring 32, the second support portion 33, and the second sealing member 34 forming the backflow prevention valve 30 are disposed inside the weight 23.

The slide member 31 and the second sealing member 34 can be moved in the axial direction D1 with respect to the second support portion 33. When the slide member 31 and the second sealing member 34 have moved opposite the tire 110, the second sealing member 34 comes into contact with the tapered surface 23*f* to close the air flow hole 23*b*. On the other hand, when the slide member 31 and the second sealing member 34 have moved to the tire 110 side, the air flow hole 23*b* is opened.

Figure 11:
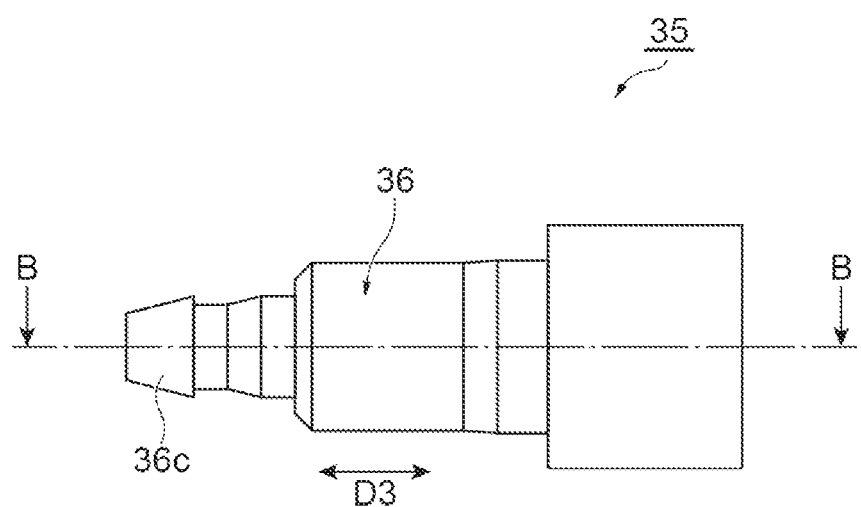
FIG. 11 is a side view showing a check valve of the tire air filling device of FIG. 8.
Figure 12:
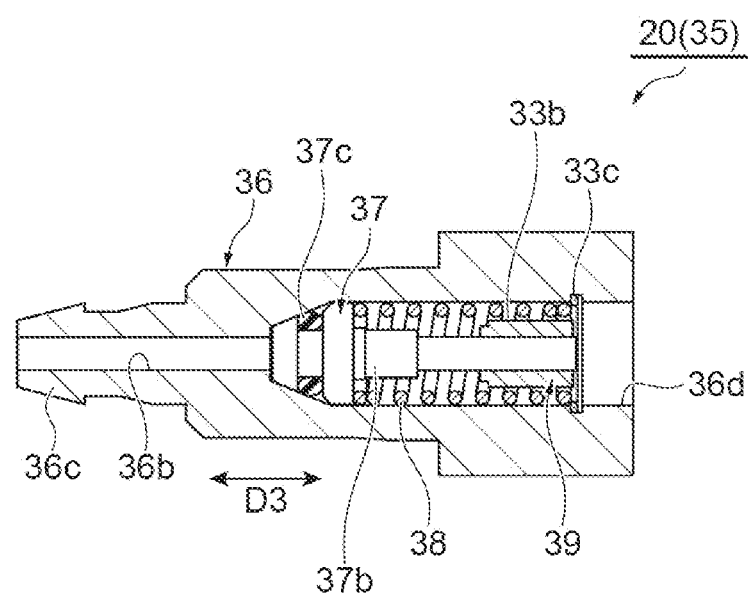
FIG. 12 is a sectional view taken along line B-B of FIG. 11.

Next, the check valve 35 will be described with reference to FIGS. 11 and 12. FIG. 11 is a side view showing the check valve 35. FIG. 12 is a sectional view of the check valve 35 taken along line B-B. For example, shapes of some components of the check valve 35 are the same as the shapes of the components included in the weight 23. Accordingly, the components can be shared, thereby contributing to a reduction in the cost of the components.

The check valve 35 includes a valve seat portion 36, a valve body portion 37, a third spring 38, and a third support portion 39. The valve seat portion 36 has an air flow hole 36*b* through which the air to be supplied from the pump 21 through the hose 40 passes. The valve body portion 37 slides in an extending direction D3 of the air flow hole 36*b* in a state where the valve body portion 37 has passed through the air flow hole 36*b*. The third spring 38 biases the valve body portion 37 to the side opposite the tire 110. The third support portion 39 supports an end portion of the third spring 38 in the extending direction D3.

The valve seat portion 36 is made of, for example, aluminum. The valve seat portion 36 includes a cylindrical portion 36*c* which protrudes opposite the valve body portion 37 (to a hose 40 side) and in which an internal space communicating with the air flow hole 36*b* is formed. The other end (end portion opposite the pump 21) of the hose 40 is connected to the cylindrical portion 36*c* by fitting the hose 40 with a clamp C2 (refer to FIG. 8).

The valve body portion 37 includes a slide member 37*b* that slides in the extending direction D3 in a state where the slide member 37*b* has passed through the air flow hole 36*b*, and a third sealing member 37*c* attached to the slide member 37*b*. At least one of a shape and a material of the slide member 37*b* is, for example, the same as at least one of the shape and the material of the slide member 31 described above.

At least one of a shape and a material of the third sealing member 37*c* is, for example, the same as at least one of the shape and the material of the second sealing member 34. At least one of a shape and a material of the third spring 38 may be the same as at least one of the shape and the material of the second spring 32.

The third support portion 39 includes, for example, the collar 33*b* and the retaining member 33*c*. An outlet 36*d* on an opposite side of the air flow hole 36*b* from the cylindrical portion 36*c* communicates with the inside of the tire 110. In the check valve 35, the air flow hole 36*b* is opened and closed as the valve body portion 37 moves with respect to the valve seat portion 36.

Specifically, when the valve body portion 37 has moved to the tire 110 side with respect to the valve seat portion 36, the valve body portion 37 opens the air flow hole 36*b*. On the other hand, when the valve body portion 37 has moved opposite the tire 110 with respect to the valve seat portion 36, the valve body portion 37 (third sealing member 37*c*) closes the air flow hole 36*b*.

An example of operation of the tire air filling device 20 will be described with reference to FIGS. 10 and 12. As shown in FIGS. 10 and 12, when the automobile is stopped, the weight 23 is located opposite the tire 110 (on the left side in FIGS. 10 and 12) by a biasing force of the first spring 26.

At this time, the slide member 31 inside the weight 23 is located opposite the tire 110 by a biasing force of the second spring 32, and the second sealing member 34 closes the air flow hole 23*b*. The valve body portion 37 of the check valve 35 is located opposite the tire 110 by a biasing force of the third spring 38, and the valve body portion 37 closes the air flow hole 36*b*.

When the automobile accelerates, the weight 23 receives a centrifugal force caused by rotation of the wheel 100, to move to the tire 110 side (right side in FIGS. 10 and 12) against the biasing force of the first spring 26. At this time, the air enters the second region A2 of the cylinder 2 from the filter 5 as the weight 23 moves to the tire 110 side. The air pressure of the first region A1 rises as the weight 23 moves to the tire 110 side, the air flows from the first region A1 to the check valve 35 through the hose 40, and the valve body portion 37 opens the air flow hole 36*b*. The air that has flowed to the check valve 35 is injected to the inside of the tire 110 by opening of the air flow hole 36*b*.

For example, when the automobile travels at a speed of 40 km/h, a state where the weight 23 is located on the tire 110 side and the first spring 26 is compressed is maintained. When an air pressure of the tire 110 is lower than an air pressure of the first region A1, the valve body portion 37 opens the air flow hole 36*b*, and the air is supplied from the first region A1 to the inside of the tire 110 through the air flow hole 36b. On the other hand, when the air pressure of the tire 110 is equal to or more than the air pressure of the first region A1, the valve body portion 37 closes the air flow hole 36b, and the air is not supplied to the tire 110.

When the automobile decelerates, centrifugal force caused by rotation of the wheel 100 decreases, and the weight 23 is moved opposite the tire 110 by the biasing force of the first spring 26. At this time, the slide member 31 inside the weight 23 moves to the tire 110 side with respect to the weight 23 against the biasing force of the second spring 32, and the second sealing member 34 opens the air flow hole 23b. The air of the second region A2 of the cylinder 22 enters the first region A1 through the air flow hole 23b due to opening of the air flow hole 23b. When the automobile is stopped, the tire air filling device 20 returns to an initial state shown in FIGS. 10 and 12.

Next, actions and effects obtained from the tire air filling device 20 will be described. In the tire air filling device 20, the weight 23 that is moved in the axial direction D1 of the cylinder 22 by centrifugal force to cause the air to be supplied to the inside of the tire 110 is provided inside the cylinder 22. The tire air filling device 20 includes the backflow prevention valve 30 inside the weight 23.

The backflow prevention valve 30 includes the slide member 31, the second spring 32, the second support portion 33, and the second sealing member 34. The slide member 31, the second spring 32, the second support portion 33, and the second sealing member 34 are disposed inside the weight 23. Therefore, the weight 23 can be reduced in diameter by providing each part of the backflow prevention valve 30 inside the weight 23. As a result, the same actions and effects as those of the tire air filling device 1 described above are obtained. Namely, since the weight 23 that is reduced in diameter can be sufficiently moved by a small load according to Pascal's principle, the air can be sufficiently supplied to the tire 110.

The tire air filling device 20 includes the check valve 35 that prevents a backflow of the air from the inside of the tire 110 into the cylinder 22. The check valve 35 is configured separately from the cylinder 22, and is provided at a position separated from the cylinder 22. Therefore, since the check valve 35 that is a backflow prevention valve that prevents a backflow of the air into the cylinder 22 is configured separately from the cylinder 22, the degree of freedom in disposing the check valve 35 can be increased. Therefore, the tire air filling device 20 can be more efficiently disposed in a limited space inside the wheel 100.

The weight 23 may include the protrusion 23j around which the first spring 26 is wound and which protrudes in the axial direction D1. In this case, since the first spring 26 can be supported by the protrusion 23j of the weight 23, the first spring 26 can be more stably extended and contracted. Since the weight 23 can be made heavier by the weight of the protrusion 23j, the weight 23 can be more easily moved by centrifugal force. Therefore, the air can be further sufficiently supplied to the tire 110.

Figure 13:
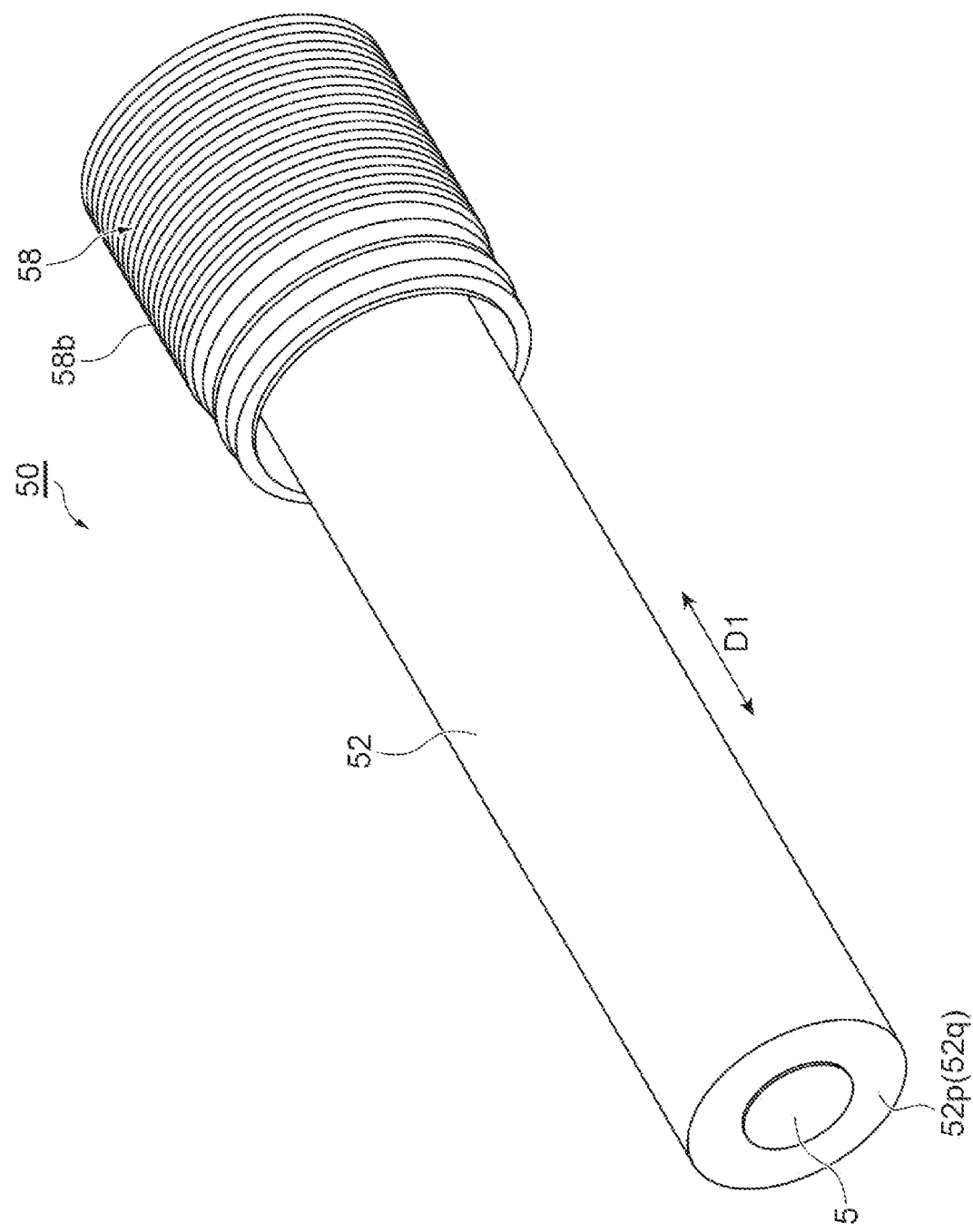
FIG. 13 is a perspective view showing a tire air filling device according to a modification example.
Figure 14:
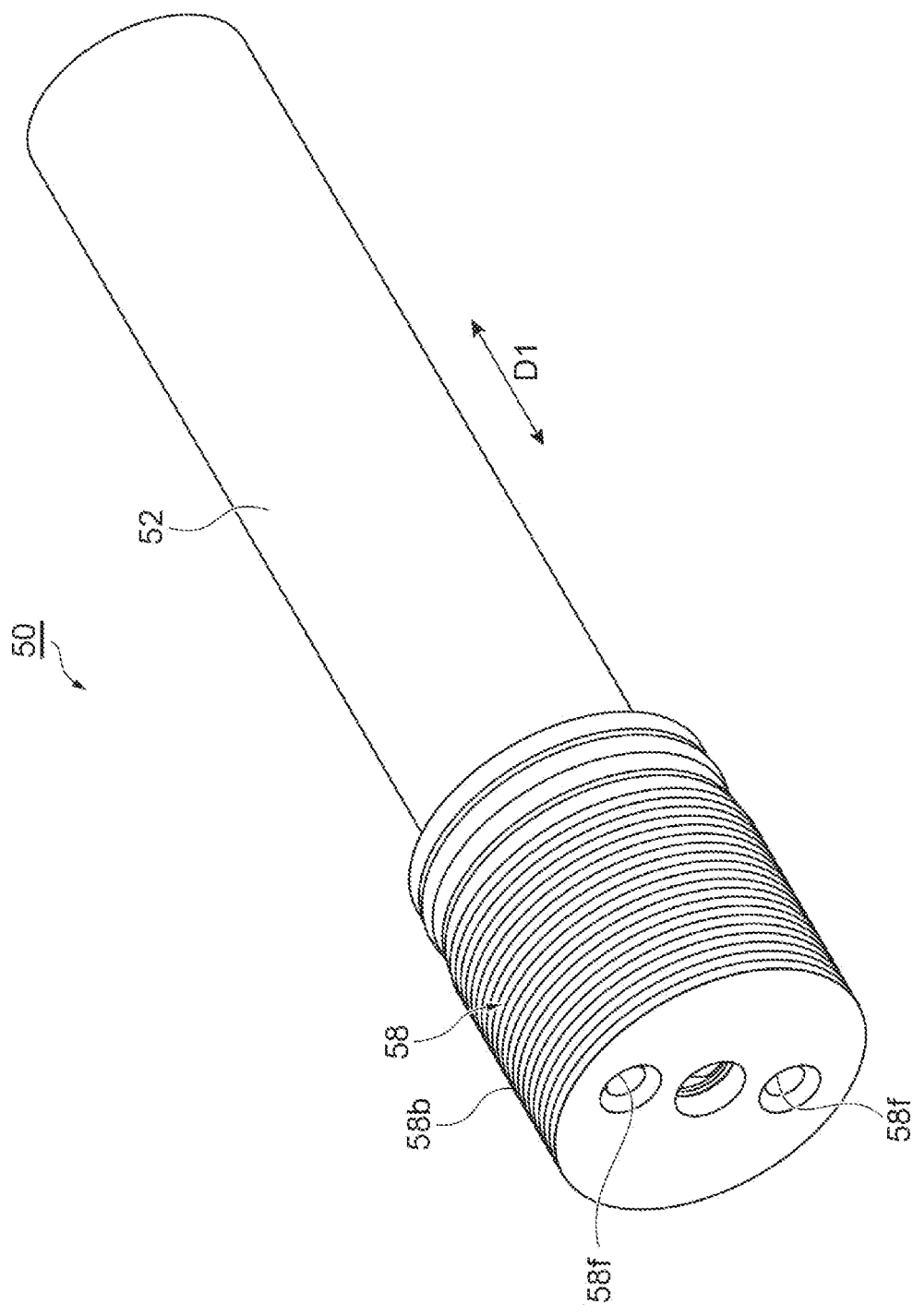
FIG. 14 is a perspective view of the tire air filling device of FIG. 13 when viewed in a direction different from that of FIG. 13.
Figure 15:
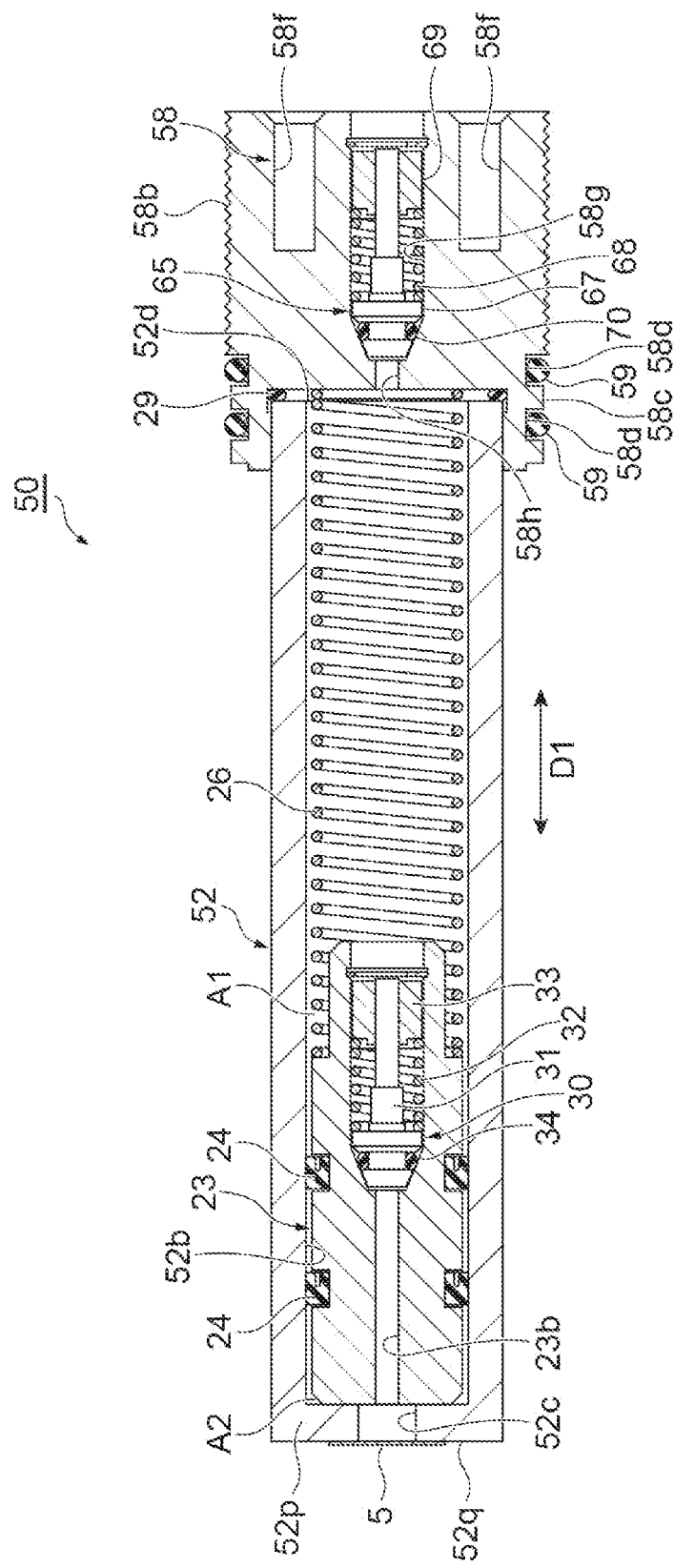
FIG. 15 is a longitudinal sectional view showing the tire air filling device of FIG. 13.

Next, a tire air filling device 50 according to a further modification example will be described with reference to FIGS. 13 to 15. Since some configurations of the tire air filling device 50 are the same as the configurations of the tire air filling device 20 described above, a description of repeat configurations of the tire air filling device 20 will be omitted below as appropriate. The tire air filling device 20 described above includes the check valve 35 configured separately from the cylinder 22. On the other hand, in the tire air filling device 50, a cylinder 52 and a check valve 65 are integrated, and the check valve 65 is built into a cap 58 that seals the cylinder 52.

The cap 58 has, for example, a cylindrical shape (circular cylindrical shape as one example). A male screw 58b that is screwed into the wheel 100 is formed in an outer peripheral surface of the cap 58. The male screw 58b is screwed into, for example, a hole formed in the spoke 101 of the wheel 100 (for example, the recessed portion 101b (refer to FIG. 3) formed in the spoke 101). Accordingly, the tire air filling device 50 can be fixed in a state where the tire air filling device 50 is inserted into the spoke 101.

The tire air filling device 50 includes the weight 23 disposed to be movable along the axial direction D1 of the cylinder 52 inside the cylinder 52, and first sealing members 24 interposed between an inner surface 52b of the cylinder 52 and the weight 23. The weight 23 and the first sealing members 24 divide an internal region of the cylinder 52 into the first region A1 on the tire 110 side and the second region A2 opposite the tire 110. The cylinder 52 has an inlet 52c in a bottom portion 52p, the air being able to flow into the second region A2 through the inlet 52c. For example, the filter 5 that closes the inlet 52c is attached to an outer surface 52q of the bottom portion 52p of the cylinder 52.

The tire air filling device 50 includes the first spring 26 disposed to extend from the weight 23 to the tire 110 side; the cap 58 that closes an opening 52d of the cylinder 52; and the fourth sealing member 29 interposed between the cap 58 and the cylinder 52. The male screw 58b described above and annular recessed portions 58d arranged with the male screw 58b in the axial direction D1 are formed in an outer peripheral surface 58c of the cap 58. The cap 58 includes, for example, two annular recessed portions 58d. The annular recessed portions 58d are formed opposite the tire 110 (on the left side in FIG. 15) when viewed from the male screw 58b.

For example, the cap 58 includes a plurality (two as one example) of the annular recessed portions 58d, and the plurality of annular recessed portions 58d are arranged along the axial direction D1. For example, fifth sealing members 59 are inserted into the respective annular recessed portions 58d. The fifth sealing member 59 is, for example, an O-ring. The fifth sealing members 59 are come into close contact with an inner surface of the spoke 101, so that internal sealing of the spoke 101 is ensured. The cap 58 further includes a screw hole 58f into which a screw is screwed, and a valve accommodation hole 58g that accommodates the check valve 65.

The tire air filling device 50 includes, for example, the backflow prevention valve 30 that prevents a backflow of the air from the weight 23 to the second region A2. The backflow prevention valve 30 includes a slide member 31, a second spring 32, a second support portion 33, and a second sealing member 34. The slide member 31 slides in the air flow hole 23b of the weight 23 in the axial direction D1. The second spring 32 biases the slide member 31 to the side opposite the tire 110. The second support portion 33 supports an end portion of the second spring 32 in the axial direction D1. The second sealing member 34 is interposed between the inner surface of the air flow hole 23b and the slide member 31.

Configurations of components of the check valve 65 are, for example, the same as configurations of components of the backflow prevention valve 30 described above. Accordingly, the components can be shared, thereby contributing to a reduction in the cost of the components. An air flow hole 58h similar to the air flow hole 23b of the weight 23 is formed in the cap 58 in which the check valve 65 is provided. The check valve 65 includes a slide member 67 that slides in the air flow hole 58h in the axial direction D1; a third spring 68 that biases the slide member 67 to the side opposite the tire 110; a third support portion 69 that supports an end portion of the third spring 68 in the axial direction D1; and a third sealing member 70. For example, the configurations of the slide member 67, the third spring 68, and the third support portion 69 are the same as the configurations of the slide member 31, the second spring 32, and the second support portion 33, respectively.

Subsequently, an example of operation of the tire air filling device 50 will be described. When the automobile is stopped, the weight 23 is located opposite the tire 110 (on the left side in FIG. 15) by the biasing force of the first spring 26. At this time, the slide member 31 inside the weight 23 is located opposite the tire 110 by the biasing force of the second spring 32, and the second sealing member 34 closes the air flow hole 23b. The slide member 67 of the check valve 65 is located opposite the tire 110 by a biasing force of the third spring 68, and the third sealing member 70 closes the air flow hole 58h.

When the automobile accelerates, the weight 23 receives a centrifugal force caused by rotation of the wheel 100, to move to the tire 110 side (right side in FIG. 15) against the biasing force of the first spring 26. At this time, the air enters the second region A2 of the cylinder 52 from the filter 5 as the weight 23 moves to the tire 110 side. The air pressure of the first region A1 rises as the weight 23 moves to the tire 110 side, the air flows from the first region A1 to the check valve 65, and the slide member 67 opens the air flow hole 58h. The air that has flowed to the check valve 65 is injected to the inside of the tire 110 by opening of the air flow hole 58h.

For example, when the automobile travels at a speed of 40 km/h, a state where the weight 23 is located on the tire 110 side and the first spring 26 is compressed is maintained. At this time, when an air pressure of the tire 110 is lower than an air pressure of the first region A1, the slide member 67 opens the air flow hole 58h, and the air is supplied from the first region A1 to the inside of the tire 110 through the air flow hole 58h. On the other hand, when the air pressure of the tire 110 is equal to or more than the air pressure of the first region A1, the slide member 67 closes the air flow hole 58h, and the air is not supplied to the tire 110.

When the automobile decelerates, centrifugal force caused by rotation of the wheel 100 decreases, and the weight 23 is moved opposite the tire 110 by the biasing force of the first spring 26. At this time, the slide member 31 inside the weight 23 moves to the tire 110 side with respect to the weight 23 against the biasing force of the second spring 32, and the second sealing member 34 opens the air flow hole 23b. The air of the second region A2 of the cylinder 52 enters the first region A1 through the air flow hole 23b due to opening of the air flow hole 23b. When the automobile is stopped, the tire air filling device 50 returns to an initial state shown in FIG. 15.

Actions and effects obtained from the tire air filling device 50 will be described. In the tire air filling device 50, the weight 23 that is moved in the axial direction D1 of the cylinder 52 by centrifugal force to cause the air to be supplied to the inside of the tire 110 is provided inside the cylinder 52. The tire air filling device 50 includes the backflow prevention valve 30 inside the weight 23, and the backflow prevention valve 30 includes the slide member 31, the second spring 32, the second support portion 33, and the second sealing member 34.

Therefore, the weight 23 can be reduced in diameter by providing each part of the backflow prevention valve 30 inside the weight 23. As a result, the same actions and effects as those of the tire air filling device 1 and of the tire air filling device 20 described above are obtained. Namely, since the weight 23 that is reduced in diameter can be sufficiently moved by a small load according to Pascal's principle, the air can be sufficiently supplied to the tire 110.

The tire air filling device 50 includes the check valve 65 that prevents a backflow of the air from the inside of the tire 110 into the cylinder 52, and the check valve 65 is integrated with the cylinder 52. The check valve 65 is provided inside the cap 58 including the male screw 58b screwed into the spoke 101. In the tire air filling device 50, the check valve 65 is built into the cap 58, so that a reduction in the diameter of the tire air filling device 50 can be realized and the tire air filling device 50 that is integrated can be screwed and fixed to the spoke 101. Therefore, the tire air filling device 50 that is compacted can be easily fixed to the spoke 101. As a result, the tire air filling device 50 can be much more efficiently disposed in the limited space inside the wheel 100.

The embodiments and the modification examples of the tire air filling device according to the present disclosure have been described above. However, the tire air filling device according to the present disclosure is not limited to the embodiments or to the modification examples described above, and may be modified or applied to other uses without changing the concept described in each claim. Namely, the shapes, sizes, number, materials, and disposition modes of the portions of the tire air filling device are not limited to each example described above, and can be appropriately changed.

For example, an example in which the weight 3 and the weight 23 are made of tungsten or a tungsten alloy has been described above. However, the material of the weight may contain, for example, gold, and is not limited to tungsten or to a tungsten alloy. For example, at least one of the slide member 31 and the collar 33b may contain tungsten.

An example in which the filter 5 that closes the inlet 22c is attached to the side surface 22p of the cylinder 22 has been described above. However, the filter 5 may be provided at a location other than the cylinder 22. For example, the filter 5 may be provided on the cap 28. In this case, foreign matter other than the air can be prevented from flowing to the outside of the pump 21 through the cap 28.

REFERENCE SIGNS LIST 1, 20, 50: tire air filling device, 2, 22, 52: cylinder, 2b, 22b, 52b: inner surface, 2c, 22c, 52c: inlet, 2g: wall portion, 2h: opening, 2j: protrusion portion, 2k: opening, 3, 23: weight, 3b, 23b: air flow hole, 3c: first space portion, 3d: second space portion, 3f: outer peripheral surface, 3g: annular recessed portion, 3h: inner surface, 3j: bottom surface, 4, 24: first sealing member, 5: filter, 6, 26: first spring, 7: first support portion, 7b: plate-shaped member, 10, 30: backflow prevention valve, 11, 31: slide member, 12, 32: second spring, 13, 33: second support portion, 14, 34: second sealing member, 15, 35, 65: check valve, 16: slide member, 17: third spring, 18: third support portion, 19: third sealing member, 21: pump, 22d: opening, 22p: side surface, 23c: first space portion, 23d: second space portion, 23f: tapered surface, 23g: annular recessed portion, 23j: protrusion, 23k: inner peripheral surface, 28, 58: cap, 28b: side surface portion, 28c: sealing portion, 28d: cylindrical portion, 29: fourth sealing member, 31b: end surface, 31c: inclined surface, 31*d*: shaft portion, 31*f*: annular recessed portion, 36: valve seat portion, 36*b*: air flow hole, 36*c*: cylindrical portion, 36*d*: outlet, 37: valve body portion, 37*b*, 67: slide member, 37*c*, 70: third sealing member, 38, 68: third spring, 39, 69: third support portion, 40: hose, 52*d*: opening, 52*p*: bottom portion, 52*q*: outer surface, 58*b*: male screw, 58*c*: outer peripheral surface, 58*d*: annular recessed portion, 58*f*: screw hole, 58*g*: valve accommodation hole, 58*h*: air flow hole, 59: fifth sealing member, 100, 100A: wheel, 100*c*: outer periphery, 101: spoke, 101*b*: recessed portion, 101*c*: through-hole, 102: central portion, 103: rim, 110: tire, 130, 130*a*: counterweight, A1: first region, A2: second region, C1, C2: clamp, D1: axial direction, D2: direction, D3: extending direction, O1, O2: center, W1, W2, W3: width.

The invention claimed is:

1. A tire air filling device that is provided in a wheel attached to a tire, and that compresses air to fill an inside of the tire with the air, the device comprising:
   a cylinder having an opening facing the inside of the tire;
   a weight that is provided inside the cylinder, that has an air flow hole through which the air to be supplied to the inside of the tire passes, and that receives a centrifugal force to move in an axial direction of the cylinder and to cause the air to be supplied from the opening to the inside of the tire;
   a first sealing member interposed between the weight and an inner surface of the cylinder;
   a first spring that biases the weight to a side opposite the tire;
   a first support portion that supports an end portion of the first spring in the axial direction; and
   a backflow prevention valve that prevents a backflow of the air from the weight to the side opposite the tire,
   wherein the backflow prevention valve includes a slide member that slides in the air flow hole in the axial direction, a second spring that biases the slide member to the side opposite the tire, a second support portion that supports an end portion of the second spring in the axial direction; and a second sealing member interposed between an inner surface of the air flow hole and the slide member, and
   the slide member, the second spring, and the second support portion are disposed inside the weight.

2. The tire air filling device according to claim 1,
   wherein the cylinder is fixed to a spoke of the wheel, and
   a width of the weight in a direction orthogonal to the axial direction is smaller than a width of the spoke.

3. The tire air filling device according to claim 1,
   wherein the weight is made of a material containing tungsten.

4. The tire air filling device according to claim 1,
   wherein the first support portion is formed of one or a plurality of plate-shaped members of which the number is adjustable, and
   a movement distance of the weight in the axial direction is adjusted by adjusting the number of the plate-shaped members.

5. The tire air filling device according to claim 1, further comprising:
   a check valve that prevents a backflow of the air from the inside of the tire into the cylinder,
   wherein the check valve is configured separately from the cylinder, and is provided at a position separated from the cylinder.

6. The tire air filling device according to claim 1, further comprising:
   a filter that allows the air to flow into and out of the cylinder, and that suppresses an inflow of foreign matter other than the air into the cylinder.

7. The tire air filling device according to claim 1,
   wherein the weight includes a protrusion around which the first spring is wound and which protrudes in the axial direction.

\* \* \* \* \*